United States Patent
Hatano et al.

(10) Patent No.: US 7,818,125 B2
(45) Date of Patent: Oct. 19, 2010

(54) MOVE GUIDANCE DEVICE, SYSTEM, METHOD, PROGRAM AND RECORDING MEDIUM STORING THE PROGRAM THAT DISPLAYS A CODE CONTAINING MAP SCALE RATE AND POSITION INFORMATION

(75) Inventors: Ichiro Hatano, Tokyo (JP); Koji Hirose, Tokyo (JP); Hitoshi Kaneko, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 707 days.

(21) Appl. No.: 11/659,729

(22) PCT Filed: Jul. 29, 2005

(86) PCT No.: PCT/JP2005/013925

§ 371 (c)(1),
(2), (4) Date: Sep. 11, 2007

(87) PCT Pub. No.: WO2006/016487

PCT Pub. Date: Feb. 16, 2006

(65) Prior Publication Data

US 2008/0077324 A1 Mar. 27, 2008

(30) Foreign Application Priority Data

Aug. 11, 2004 (JP) ............................. 2004-234734

(51) Int. Cl.
*G01C 21/36* (2006.01)
(52) U.S. Cl. .................................. 701/212; 340/995.16
(58) Field of Classification Search .................. 701/212

See application file for complete search history.

(56) References Cited

U.S. PATENT DOCUMENTS 4,631,678 A * 12/1986 Angermuller et al. ....... 701/200
5,406,491 A * 4/1995 Lima ........................... 701/210

(Continued)

FOREIGN PATENT DOCUMENTS

JP          08202261 A * 8/1996

(Continued)

*Primary Examiner*—Thomas G Black
*Assistant Examiner*—Shelley Chen
(74) *Attorney, Agent, or Firm*—Kratz, Quintos & Hanson, LLP

(57) ABSTRACT

Based on a transfer request from a portable terminal though an input operation or communication, a two-dimensional code is generated, the code containing information of a scale rate of map information for guidance displayed on the in-vehicle terminal and a current position of a vehicle. The two-dimensional code is displayed on a terminal display unit together with a region of the map information corresponding to a region to be displayed on the portable terminal. When the portable terminal captures the two-dimensional code with an image pickup unit, the portable terminal recognizes the scale rate and the current position with a code analyzer, receives a region of the map information corresponding to the scale rate and containing at least the current position from the server unit and displays the information on the portable terminal display unit. The map information can be continuously displayed on a separate terminal in a similar manner without giving a user a feeling of strangeness, so that the user can obtain guidance well.

24 Claims, 11 Drawing Sheets

U.S. PATENT DOCUMENTS

| | | | |
|---|---|---|---|
| 5,864,125 A * | 1/1999 | Szabo | 235/384 |
| 5,948,040 A * | 9/1999 | DeLorme et al. | 701/201 |
| 6,256,578 B1 * | 7/2001 | Ito | 701/200 |
| 6,912,462 B2 * | 6/2005 | Ogaki | 701/208 |
| 7,425,969 B2 * | 9/2008 | Ogaki | 345/660 |
| 2005/0187706 A1 * | 8/2005 | Ogaki | 701/208 |
| 2006/0161344 A1 * | 7/2006 | Iwahori et al. | 701/211 |

FOREIGN PATENT DOCUMENTS

| | | |
|---|---|---|
| JP | 2001-33265 | 2/2001 |
| JP | 2002-48586 | 2/2002 |
| JP | 2002-267461 | 9/2002 |
| JP | 2003-121183 | 4/2003 |
| JP | 2003-302242 | 10/2003 |
| JP | 2004-46781 | 2/2004 |

\* cited by examiner

US 7,818,125 B2

MOVE GUIDANCE DEVICE, SYSTEM, METHOD, PROGRAM AND RECORDING MEDIUM STORING THE PROGRAM THAT DISPLAYS A CODE CONTAINING MAP SCALE RATE AND POSITION INFORMATION

TECHNICAL FIELD

The present invention relates to a travel guiding device, a terminal travel guiding device, a portable travel guiding device, a travel guiding system, a travel guiding method, a travel guiding program and a recording medium recording the program which are for providing guidance on a travel of a mobile body.

BACKGROUND ART

In-vehicle navigation devices have been known, which acquire map information or a travel route via communication and guide a vehicle based on the acquired map information or the acquired travel route (see, for example, Patent Document 1). The navigation device disclosed in Patent Document 1 judges with a communication status recognizer of an in-vehicle terminal whether information transmission with a server unit can be conducted. When it is judged that no information transmission can be conducted, current position information, destination information and setting information acquired by the terminal are stored in an embedded memory for a waiting status. Communication condition is checked at a predetermined time interval. When it is judged that information transmission can be conducted, a terminal communicating section is controlled by a terminal system controller to send the information stored in the embedded memory to the server unit. The server sets a travel route based on the information and sends the travel route to the terminal. The terminal, which is now in good communication with the server unit and has received the travel route, guides the vehicle based on the received travel route.

[Patent Document 1] Japanese Laid-Open Patent Publication No. 2003-302242 (left column of page 6 to left column of page 11).

DISCLOSURE OF THE INVENTION

Problems to be Solved by the Invention

In the above-described communication-type navigation device disclosed in Patent Document 1, when a user travels to a destination on foot, the terminal needs portability for the user. However, arranging the terminal so as to be easily carried may limit functions and accuracy of the terminal, so that the terminal may not provide enough usability or accuracy when being set and used in the vehicle, which may be a problem.

As a method for acquiring information, optically reading a code represented in a graphic pattern such as a barcode has been known (see, for example, JP 2004-46781-A). JP 2004-46781-A discloses that a barcode issuing server receives content data from a development machine of a content provider, converts the data into a two-dimensional barcode optically readable by a portable phone and generates image data of the two-dimensional barcode. The barcode issuing server returns the generated image data of the two-dimensional barcode to the development machine. The image data of the two-dimensional barcode is captured by a capture function of the portable phone and decoded, so that the content data such as a cooking recipe is displayed on a liquid crystal display screen.

Accordingly, it is conceivable that the travel route in a form of a barcode can be read from the terminal like JP 2004-46781-A and the user off the vehicle travels based on the travel route acquired in the portable phone. However, since display screens of portable phones are generally small, when the travel route has a long distance from a position of getting off the vehicle, a map may be displayed at a large scale rate, so that the user may not be provided with enough guidance.

Accordingly, an object of the invention is to provide a travel guiding device, a portable travel guiding device, a travel guiding system, a travel guiding method, a travel guiding program and a recording medium recording the program, which provide guidance in a good continuous manner with an easy arrangement.

Means for Solving the Problems

A travel guiding device according to an aspect of the invention includes: a map information acquirer which acquires map information; a current position information acquirer which acquires current position information on a current position of a mobile body; a display controller which performs control such that a region of the map information is displayed on a display, the region containing the current position, the display controller recognizing a scale rate of the map information displayed on the display; a request signal recognizer which recognizes a request signal for requesting a transfer of the map information; and an information converter which recognizes the request signal, converts data into a code having a data structure of a predetermined image, the code containing scale rate information on the scale rate of the map information and the current position information, the code being optically readable, the information converter operating the display controller to display the code as the image on the display.

A portable travel guiding device according to an aspect of the invention includes: a terminal communicating section which sends and receives information via a network, a terminal display which displays map information; an image pickup unit; an information acquirer which acquires the scale rate information and the current position information from the code which is displayed on the display and captured by the image pickup unit by the aforesaid travel guiding device; a map information reception controller which operates the terminal communicating section to receive a region of the map information corresponding to a scale rate of the scale rate information and containing the current position via the network from a storage storing the map information; and a terminal display controller which operates the terminal display to display the received map information.

A portable travel guiding device according to an aspect of the invention includes: a terminal communicating section which sends and receives information via a network, a terminal display which displays map information; an image pickup unit; an information acquirer which acquires the scale rate information and the current position information from a code having a data structure of a predetermined image, the code containing scale rate information on a scale rate of the map information which is captured by the image pickup unit and current position information on a current position of a mobile body, the code being optically readable; a map information reception controller which operates the terminal communicating section to receive the map information corresponding to the scale rate of the scale rate information and containing at least the current position via the network from the storage storing the map information when the map information reception controller recognizes acquisition of the scale rate information and the current position information; and a terminal display controller which operates the terminal display to display the received map information.

A travel guiding system according to an aspect of the invention includes: the aforesaid travel guiding device; and the aforesaid portable travel guiding device, the portable travel guiding device operating such that the map information is displayed on the terminal display based on the code displayed on the display of the travel guiding device.

A travel guiding method according to an aspect of the invention includes: acquiring current position information on a current position of a mobile body and map information; displaying a region of the map information containing the current position on a display, the method providing guidance on a travel status of a mobile body, the method being performed by a computer; on recognition of a request signal for a transfer of the map information, converting data into a code having a data structure of a predetermined image, the code containing scale rate information on a scale rate of the map information and the current position information, the code being optically readable; and displaying the converted code on the display.

A travel guiding method according to an aspect of the invention includes: reading a code displayed by the aforesaid travel guiding method by capturing with an image pickup unit of a computer; acquiring the scale rate information and the current position information which are read from the code; receiving with a communicating section a region of the map information via a network from a storage storing the map information, the region corresponding to a scale rate of the scale rate information and containing at least the current position; and displaying the received map information on a terminal display.

A travel guiding program according to an aspect of the invention controls a computer to work as the aforesaid travel guiding device, the program alternatively controlling the computer as the aforesaid portable travel guiding device.

A travel guiding program according to an aspect of the invention operates a computer to execute the aforesaid travel guiding method.

In a recording medium recording a travel guiding program according to an aspect of the invention, the aforesaid travel guiding program is recorded in a manner readable by a computer.

EXPLANATION OF CODES

Figure 1:
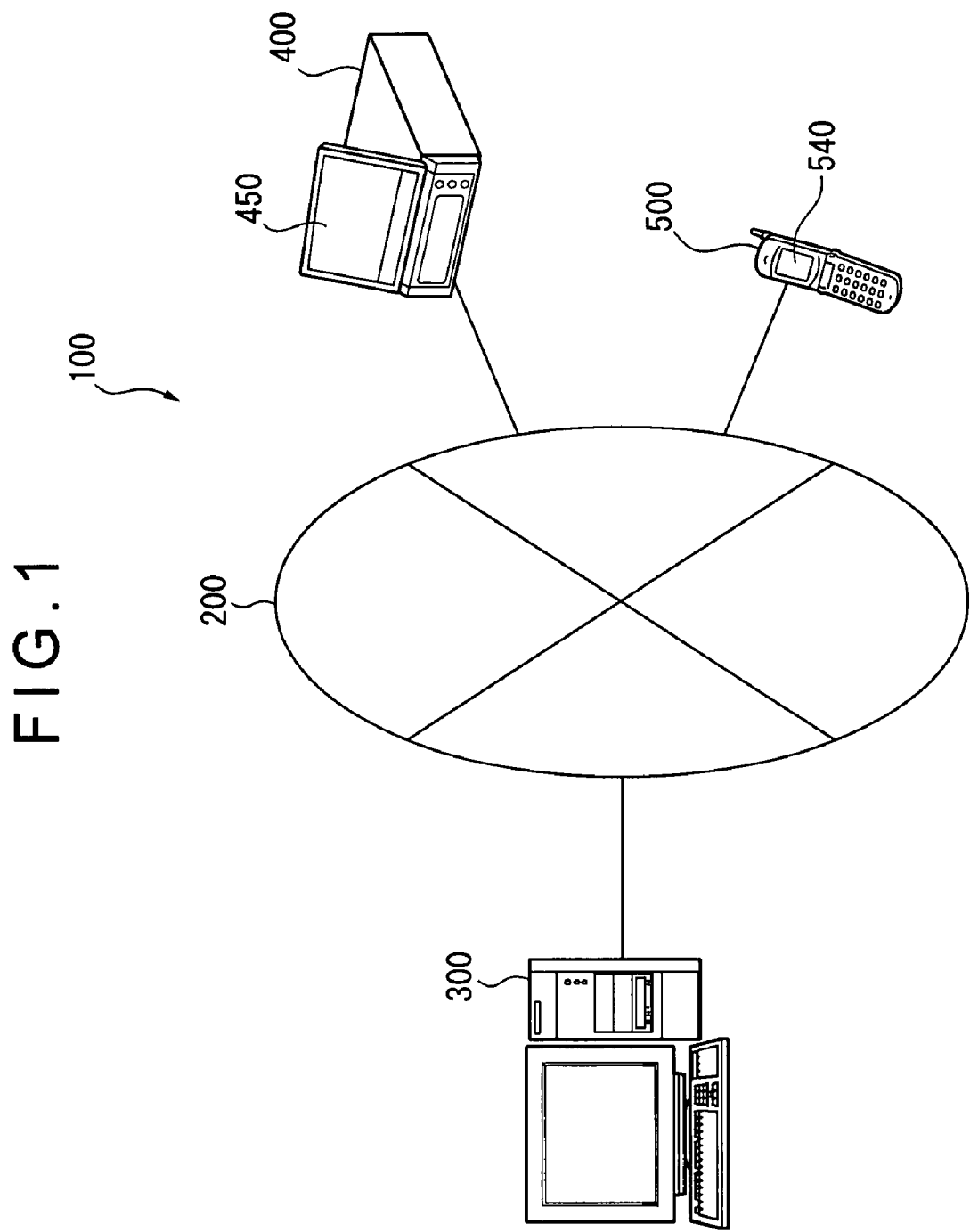
FIG. 1 is a schematic diagram briefly showing a navigation system of an embodiment of a travel guiding system of the present invention.

100: navigation system as a travel guiding system capable of also functioning as a travel guiding device
200: network
320: server storage as a storage
400: in-vehicle terminal as a travel guiding device
450: terminal display unit as a display
480: terminal computer as a computer
481: current position recognizer as a current position information acquirer
482: destination information acquirer
484: display controller also functioning as a scale recognizer
486: travel route setting section as a travel route retriever also functioning as a map information acquirer and a scale recognizer
487: request signal recognizer
488: information converter
500: portable terminal as a portable travel guiding device
510: portable terminal communication unit as a terminal communicating section
520: positioning section
540: portable terminal display unit as a terminal display
570: image pickup unit
590: portable terminal computer as a computer
591: terminal position recognizer as a position information acquirer
592: terminal display controller
594: code analyzer as an information acquirer
595: map information reception controller

BEST MODE FOR CARRYING OUT THE INVENTION

Figure 2:
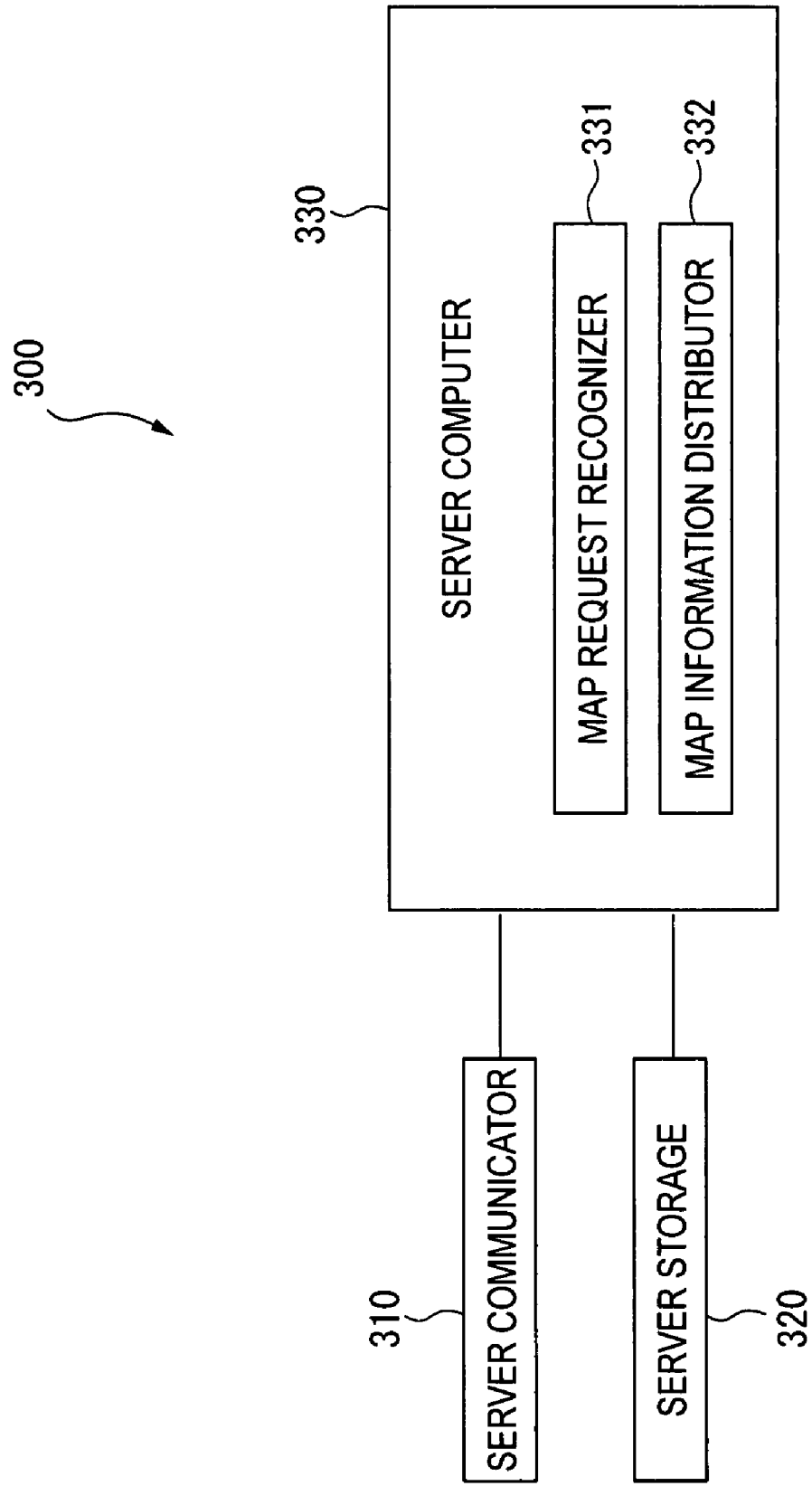
FIG. 2 is a block diagram briefly showing a server unit of the embodiment.
Figure 3:
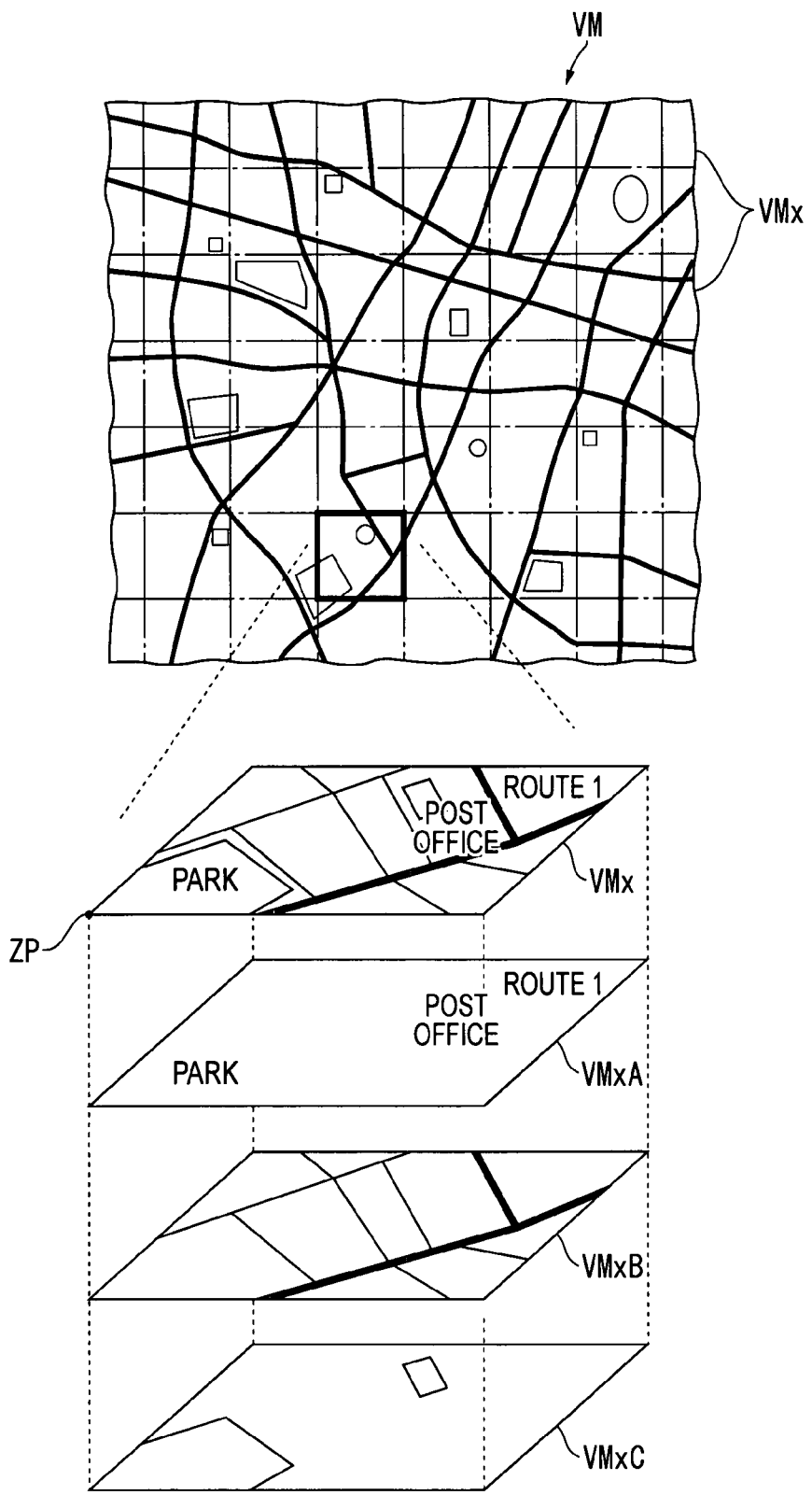
FIG. 3 is a conceptual diagram schematically showing a table structure of display data of map information of the embodiment.
Figure 4:
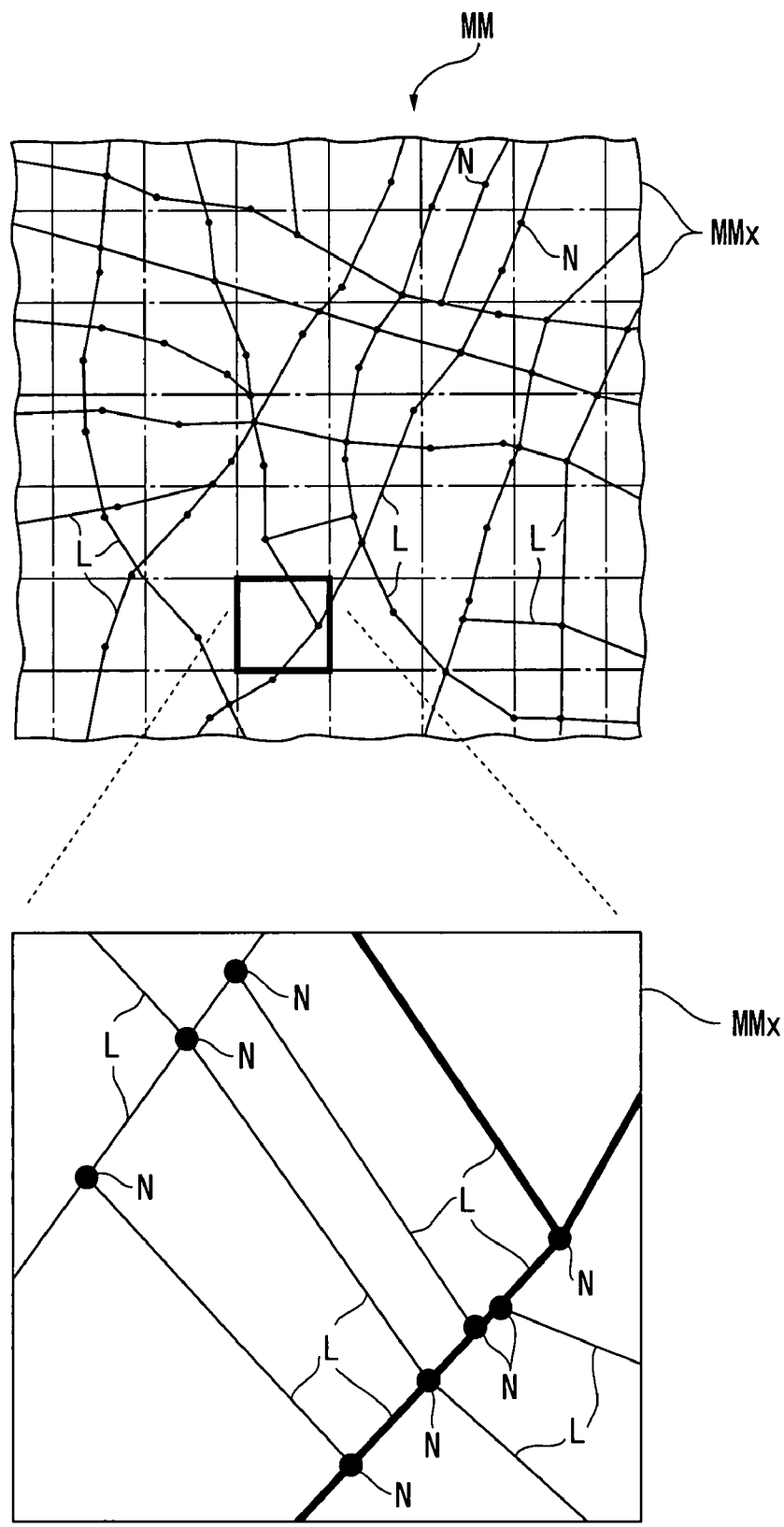
FIG. 4 is a conceptual diagram schematically showing a table structure of matching data of the map information of the embodiment.
Figure 5:
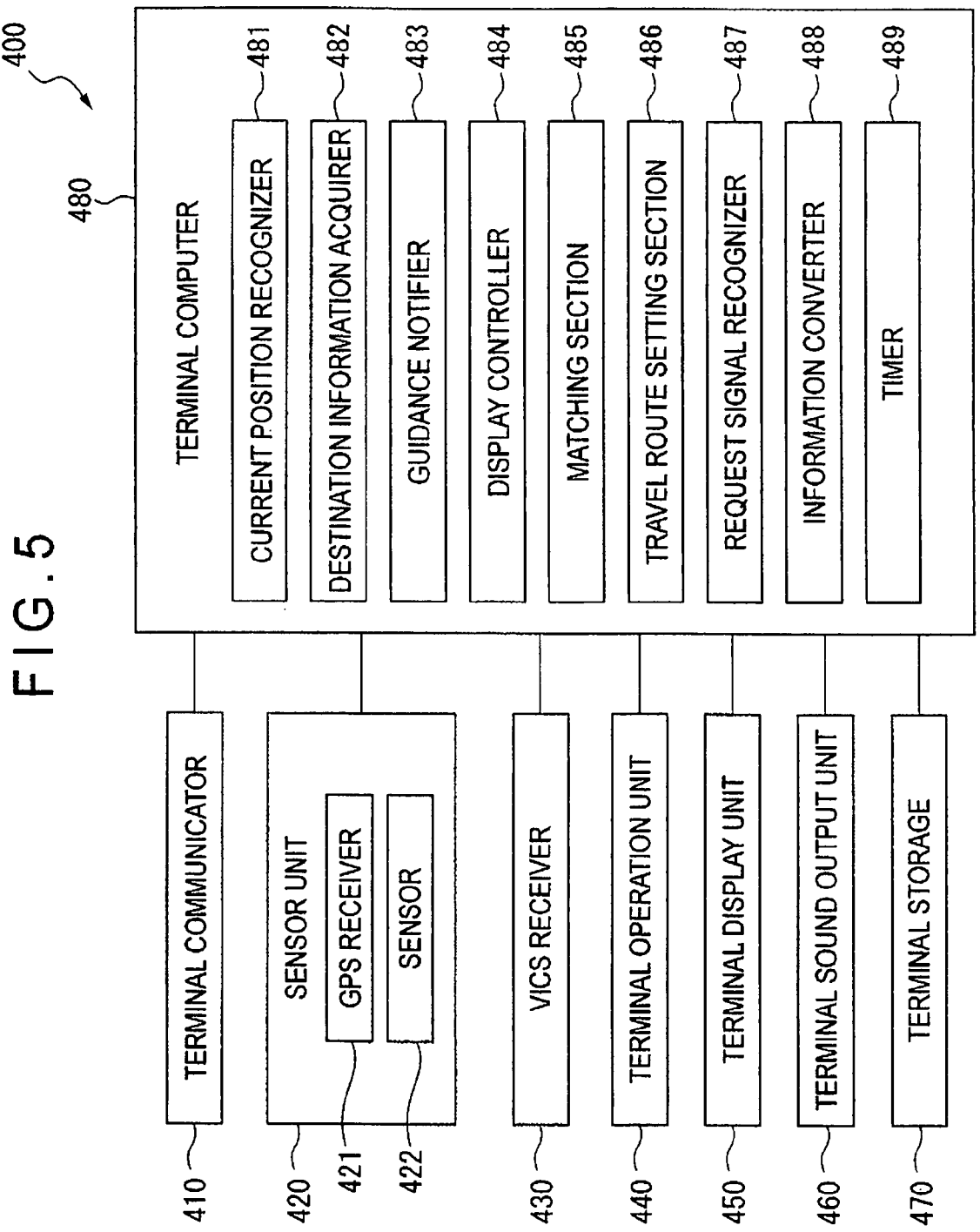
FIG. 5 is a block diagram briefly showing an in-vehicle terminal of the embodiment.
Figure 6:
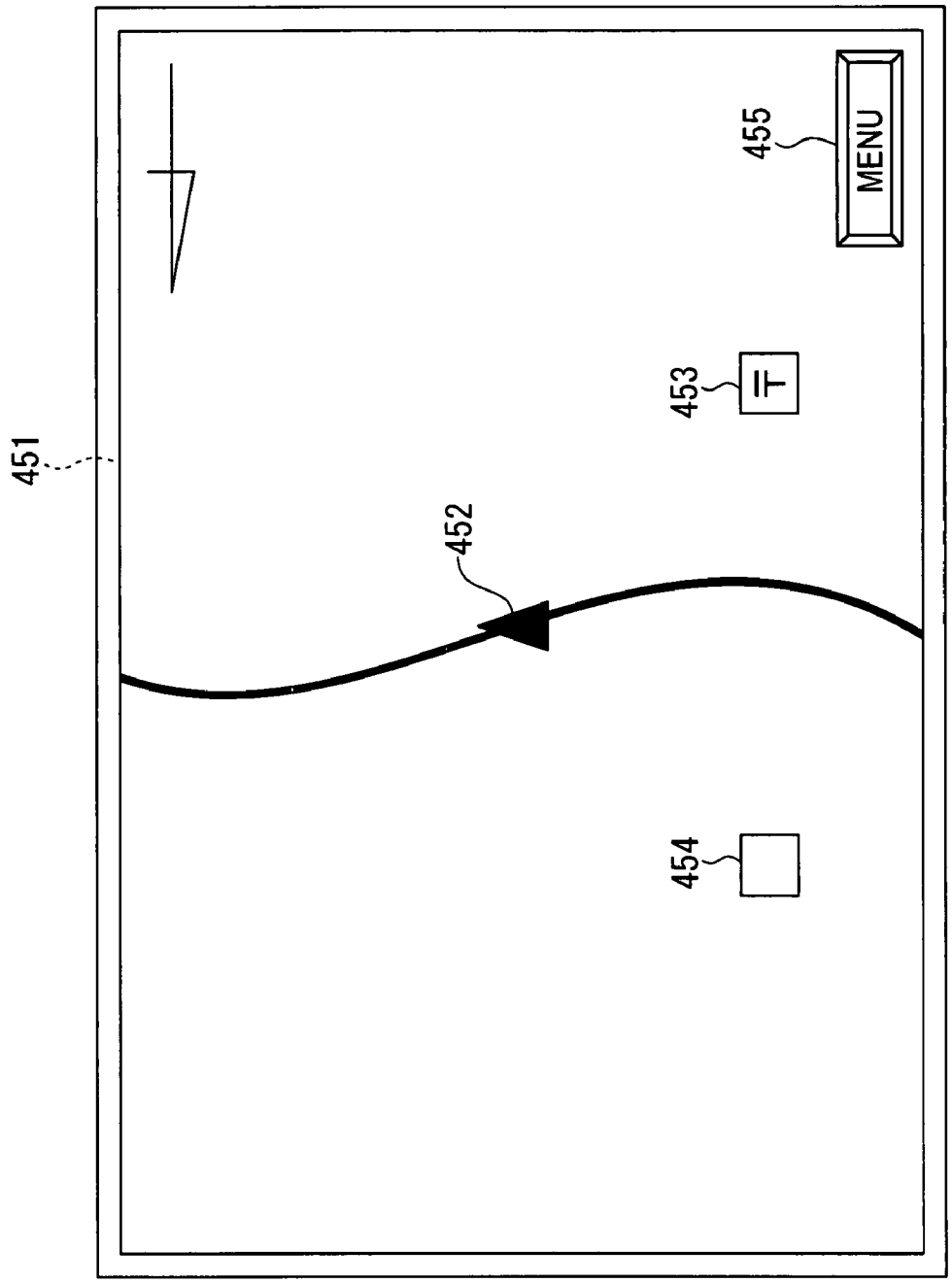
FIG. 6 is an explanatory illustration showing the map information displayed on a terminal display unit of the in-vehicle terminal of the embodiment.
Figure 7:
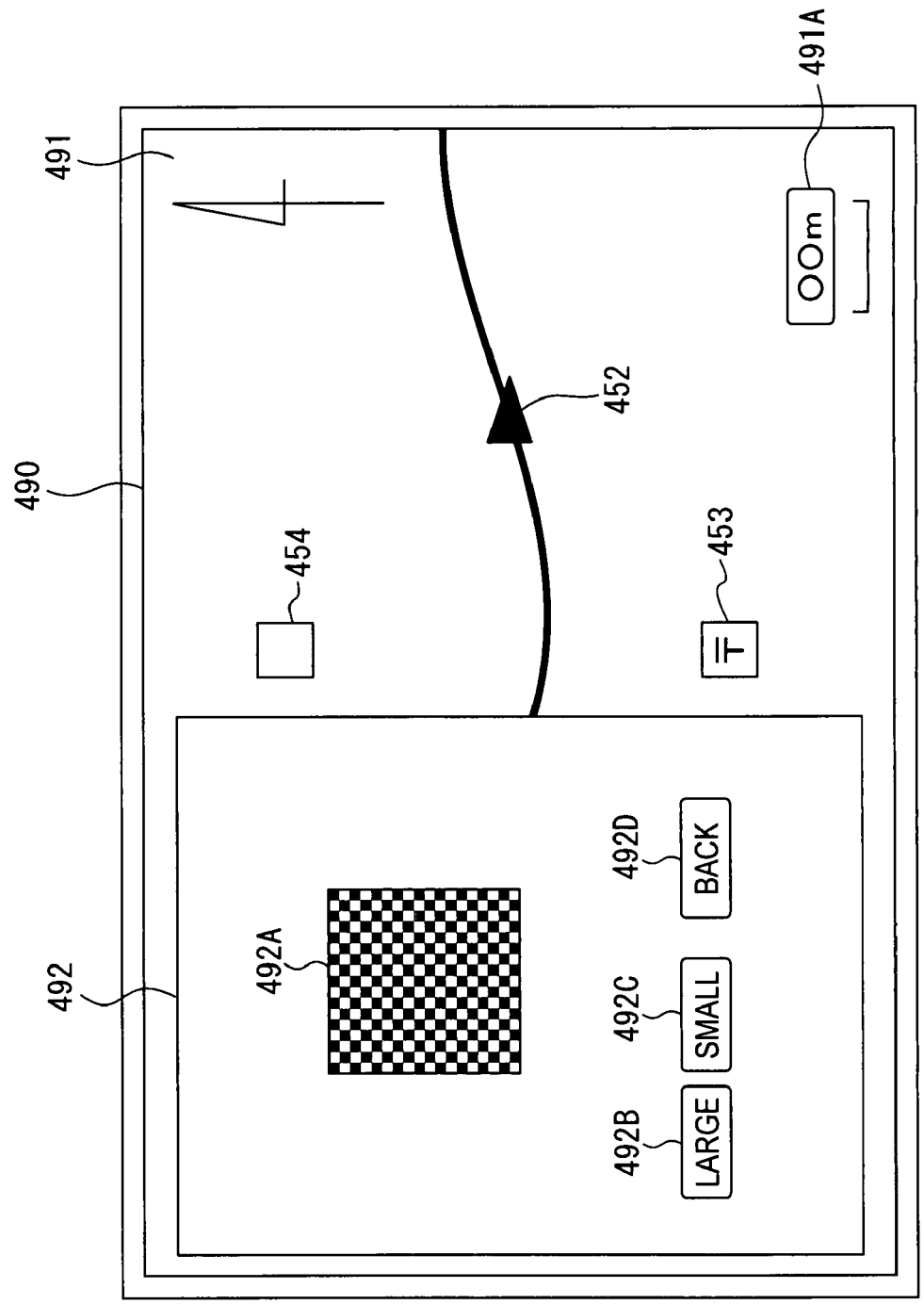
FIG. 7 is an explanatory illustration showing a transfer display screen displayed on the terminal display unit of the in-vehicle terminal of the embodiment.
Figure 8:
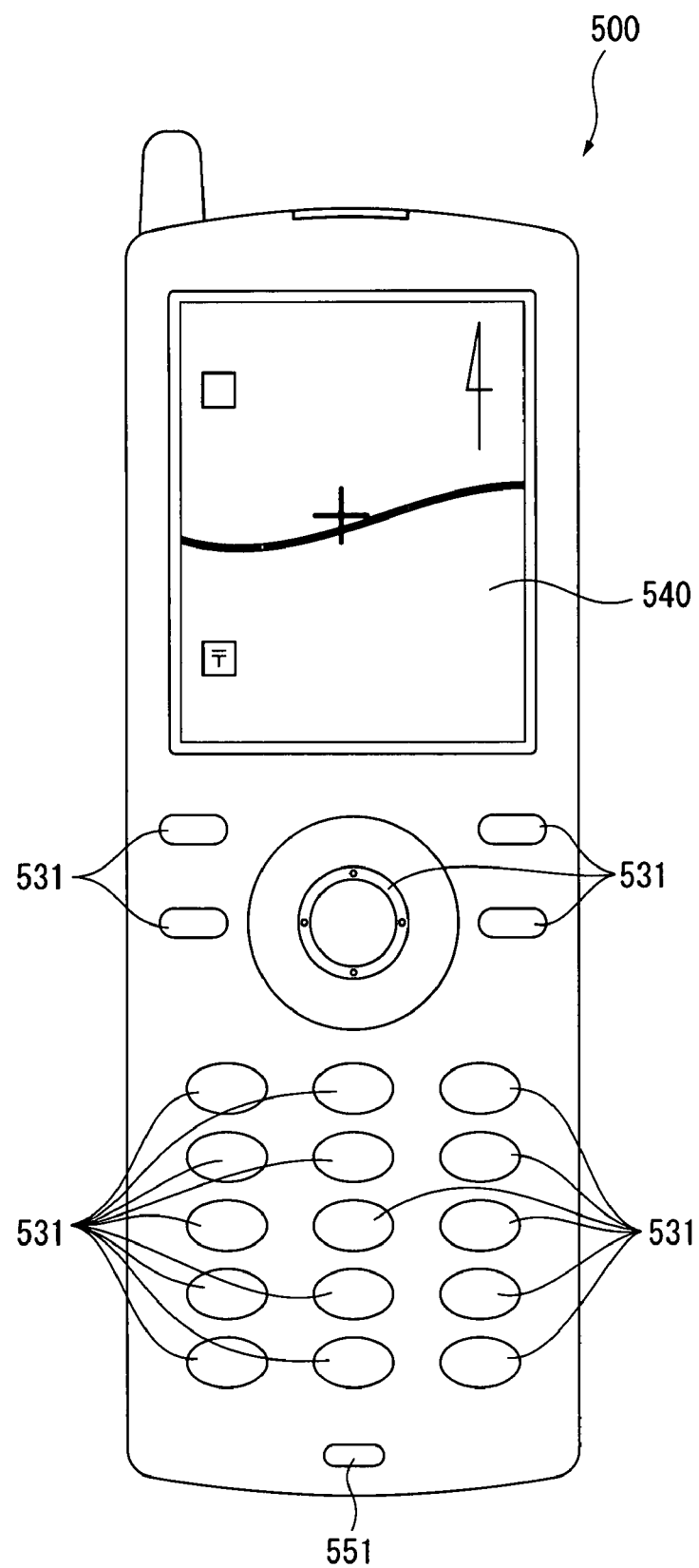
FIG. 8 is an illustration showing an appearance of a portable terminal on which the map information is displayed of the embodiment.
Figure 9:
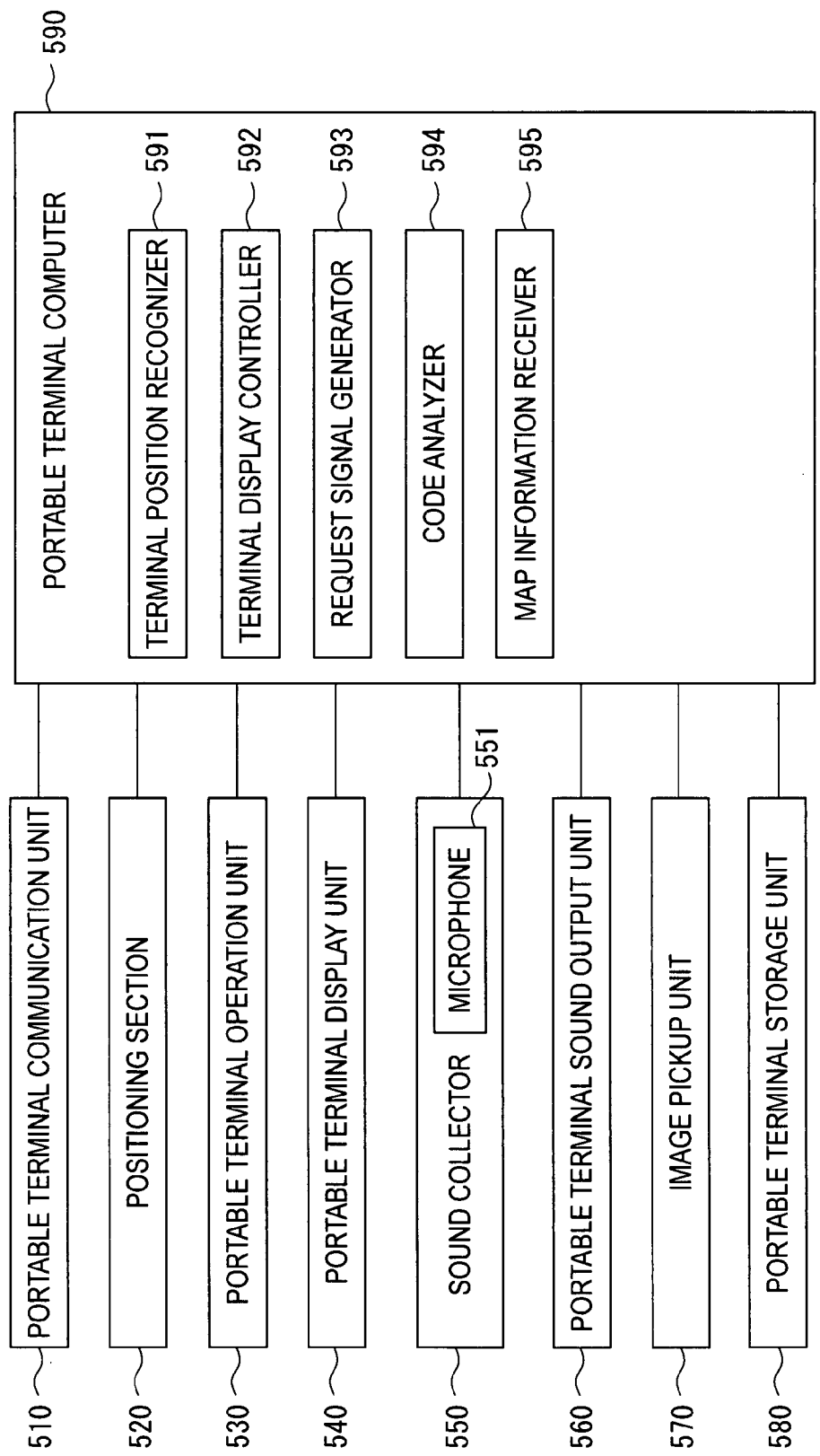
FIG. 9 is a block diagram briefly showing the portable terminal of the embodiment.

A first embodiment of the present invention will be described below with reference to the attached drawings. In the first embodiment, a navigation system as a travel guiding system according to the invention will be described below, the navigation system guiding a travel of a vehicle as a mobile body. The travel guiding system of the invention may be used not only for guiding a travel of a vehicle but also for any mobile body such as an aircraft and a ship FIG. 1 is a schematic diagram briefly showing an arrangement of the navigation system. FIG. 2 is a block diagram briefly showing an arrangement of a server unit. FIG. 3 is a conceptual diagram schematically showing a table structure of display data of map information. FIG. 4 is a conceptual diagram schematically showing a table structure of matching data of the map information. FIG. 5 is a block diagram briefly showing an arrangement of an in-vehicle terminal. FIG. 6 is an explanatory illustration showing the map information displayed on a terminal display unit of the in-vehicle terminal. FIG. 7 is an explanatory illustration showing a transfer display screen displayed on the terminal display unit of the in-vehicle terminal. FIG. 8 is an illustration briefly showing an appearance of a portable terminal on which the map information is displayed. FIG. 9 is a block diagram briefly showing an arrangement of the portable terminal.

[Arrangement of Navigation System]

In FIG. 1, the reference numeral 100 denotes the navigation system as the travel guiding system capable of also functioning as a travel guiding device. The navigation system 100 may notify a user of guidance on a travel of a vehicle (a mobile body) in response to a traveling status of the vehicle or may notify a user of guidance on a travel of the user when carried away from the mobile body with the user. As mentioned above, the mobile body is not limited to vehicles but includes any type of mobile body such as aircrafts and ships. The navigation system 100 includes a network 200, a server unit 300, an in-vehicle terminal 400 as a travel guiding device of in-vehicle type which is mounted in a vehicle (a mobile body) and a portable terminal 500 as a portable travel guiding device of portable type.

(Arrangement of Network)

The network 200 is connected with the server unit 300, the in-vehicle terminal 400 and the portable terminal 500. The network 200 connects the server unit 300, the in-vehicle terminal 400 and the portable terminal 500 such that information is sent and received among these components. The network 200 may be the Internet based on a general-purpose protocol such as TCP/IP protocol, an intranet, a LAN (Local Area Network), a communication network and a broadcasting network that have a plurality of base stations capable of sending and receiving information by way of a radio medium, or the radio medium itself that enables direct transmission of information among the server unit 300, the in-vehicle terminal 400 and the portable terminal 500. The radio medium may be any one of electric waves, light, acoustic waves and electromagnetic waves.

(Arrangement of Server Unit)

The server unit 300 distributes map information in response to a request from the in-vehicle terminal 400 or the portable terminal 500. As shown in FIG. 2, the server unit 300 includes a server communicator 310, a server storage 320 as a storage, a server computer 330 and the like.

The server communicator 310 performs a preset input interface process in response to a signal input via the network 200 and outputs a signal to the server computer 330. When a signal to be sent to the in-vehicle terminal 400 or the portable terminal 500 is input from the server computer 330, the server communicator 310 performs a preset output interface process in response to the input signal and outputs a signal to a predetermined destination such as the in-vehicle terminal 400 or the portable terminal 500 via the network 200, the destination identified based on information contained on the input signal.

The server storage 320 includes a drive or a driver which readably stores information in a recording medium such as a magnetic disk like a HD (Hard Disk), an optical disc like a DVD (Digital Versatile Disc) and a memory card. For example, the server storage 320 stores map information shown in FIGS. 3 and 4 in a readable manner. The server storage 320 may contain personal data on users of the navigation system 100, model data of the portable terminal 500 and the like. The personal data includes the name, address, unique ID number, password and the like of a user, the types of the in-vehicle terminal 400 and the portable terminal 500, an address number for information transmission with the in-vehicle terminal 400 or the portable terminal 500. The server storage 320 may not include the drive or the driver but may use a semiconductor memory.

The map information includes display data VM that is so-called POI (Point Of Interest) data shown in FIG. 3, matching data MM shown in FIG. 4 and travel route retrieval map data (not shown).

The display data VM includes plural pieces of display mesh information VMx, each assigned with a unique number. The display data VM is divided into plural pieces of display mesh information VMx, each relating to a certain region. The display data VM is constituted of the plural pieces of display mesh information VMx continuously arranged in a matrix form. The display mesh information VMx may be further divided into plural pieces of sub display mesh information VMx, each relating to a certain sub region. The display mesh information VMx has a rectangular shape with sides having a predetermined length that is obtained by reducing an actual geographic length in accordance with a map scale. A predetermined corner of the rectangular shape has absolute coordinates ZP in the whole map information, for example on a global map.

The display mesh information VMx includes name information VMxA such as names of intersections, road information VMxB and background information VMxC. The name information VMxA is structured in a table for displaying miscellaneous element data such as an intersection name or an area name in a region at a predetermined position in relationship to the absolute coordinates ZP. The road information VMxB is structured in a table for displaying road element data such as a road in a region at a predetermined position in relationship to the absolute coordinates ZP. The background information VMxC is structured in a table for displaying miscellaneous element data such as a mark or an image representing a well-known place or a well-known building at a predetermined position in relationship to the absolute coordinates ZP.

Similarly to the display data VM, the matching data MM is divided into plural pieces of matching mesh information MMx, each having a unique number and relating to a certain region. The matching data MM is constituted of the plural pieces of matching mesh information MMx continuously arranged in a matrix form. The matching mesh information MMx may be further divided into plural pieces of sub matching mesh information MMx, each relating to a certain sub region. The matching mesh information MMx has a rectangular shape with sides having a predetermined length that is obtained by reducing an actual geographic length in accordance with a map scale. A predetermined corner of the rectangular shape has absolute coordinates ZP in the whole map information, for example on a global map. The matching mesh information MMx and the display mesh information VMx may not represent a common region and may be divided in different scales. When being divided in a common scale, the matching mesh information MMx and the display mesh information VMx may be associated by means of the unique numbers. When being divided in different scales, the matching mesh information MMx and the display mesh information VMx may be associated by means of the absolute coordinates ZP.

The matching data MM is used in a map matching process for correcting a display error such as displaying a vehicle mark not on a road but on a building in superposing a traveling status of the vehicle on the map information such that the vehicle mark is positioned on the road. The matching data MM has plural pieces of link string block information. As shown in FIG. 4, the link string block information is structured in a table in which a plurality of links L is associated by a predetermined rule. The link L (segment information) connects nodes N (point information) to represent a road, each node N representing a point. Specifically, the links L are associated to form a continuous broken link string representing a certain length such as a road like Koshu street and Ome street. Each link L has segment-specific information that is a unique number (hereafter referred to as a link ID) and node information that is a unique number assigned to two nodes N connected by the link L. The link L is associated with a VICS link such that a position on a displayed map corresponds to VICS data. The node N represents a joint point such as an intersection, a corner, a fork, a junction or the like of a road. Information on the node N includes the point-specific information that is the unique number assigned to each node N in the link string block information, coordinate information on the position of the node N and flag information (fork information) on whether or not the node N is a fork position on which a plurality of links intersects such as an intersection and a fork.

Travel route retrieval map information is structured in a table similar to the matching data MM, the table containing the point information on points such as the nodes N for representing roads and the segment information such as the links L connecting the points. The travel route retrieval map information is structured to display roads for a travel route retrieval.

The server computer 330 includes a CPU (Central Processing Unit) and is connected with the server communicator 310 and the server storage 320. The server computer 330 includes a map request recognizer 331 and a map information distributor 332 as programs run by an OS (Operation System) that controls the whole operation of the server unit 300, the OS being stored in, for example, the server storage 320 or a memory (not shown).

The map request recognizer 331 acquires a map request signal from the in-vehicle terminal 400 or the portable terminal 500 based on a signal received by the server communicator 310, the map request signal being for requesting a distribution of the map information. The map request signal includes information identifying a sender such as the in-vehicle terminal 400 or the portable terminal 500 and information identifying a status of the requested map information.

The map information distributor 332 retrieves requested map information from the server storage 320 based on the information identifying the status of the requested map information in the map request signal acquired by the map request recognizer 331 namely based on information identifying a scale rate and a region or a current position. The map information distributor 332 operates such that the retrieved map information is sent by the server communicator 310 via the network 200 to the sender such as the in-vehicle terminal 400 or the portable terminal 500 based on the information identifying the sender of the map request signal.

(Arrangement of In-Vehicle Terminal)

The in-vehicle terminal 400 acquires the map information distributed via the network 200 from the server unit 300. Based on the acquired map information, the in-vehicle terminal 400 displays information on the current position or a destination, retrieves and displays a route for the destination or a nearest shop of interest, or displays details of service the shop provides. As shown in FIG. 5, the in-vehicle terminal 400 includes a terminal communicator 410, a sensor unit 420, a VICS (Vehicle Information Communication System) receiver 430 as a traffic information acquirer, a terminal operation unit 440, a terminal display unit 450 as a display, a terminal sound output unit 460, a terminal storage 470, a terminal computer 480 as a computer and the like.

The terminal communicator 410 is connected to the terminal computer 480 and to the server unit 300 via the network 200. The terminal communicator 410 can receive a terminal signal from the server unit 300 via the network 200, performs a preset input interface process based on the acquired terminal signal and outputs a processing terminal signal to the terminal computer 480. The terminal communicator 410 can receive the processing terminal signal from the terminal computer 480, performs a preset output interface processing based on the input processing terminal signal and sends a terminal signal via the network 200 to the server unit 300.

The sensor unit 420 detects a traveling status of the vehicle. The sensor unit 420 includes a GPS (Global Positioning System) receiver 421 and sensors 422 such as a speed sensor, an azimuth sensor and an acceleration sensor (not shown). The GPS receiver 421 receives electric navigation waves output from a GPS satellite (not shown), which is an artificial satellite, with an antenna (not shown). The GPS receiver 421 computes simulated coordinate values of the current position based on a signal corresponding to the received electric navigation waves and outputs GPS data to the terminal computer 480. The speed sensor is mounted on a vehicle and detects the driving speed and actual acceleration of the vehicle based on signals which vary in response to the driving speed (a traveling speed) of the vehicle. The speed sensor reads a pulse signal, a voltage value and the like output in response to rotation of axles and wheels of the vehicle. The speed sensor outputs detection information such as the read pulse signal and voltage value to the sensor unit 420. The sensor unit 420 appropriately outputs the information to the terminal computer 480. The azimuth sensor is mounted on the vehicle and includes a so-called gyro-sensor (not shown) and detects an azimuth or a traveling direction in which the vehicle is proceeding. The azimuth sensor outputs a signal of detection information on the detected traveling direction to the sensor unit 420. The sensor unit 420 appropriately outputs the signal to the terminal computer 480. The acceleration sensor is mounted on the vehicle and detects the acceleration of the vehicle in the driving direction. The acceleration sensor converts the detected acceleration into a sensor output value that is detection information such as a pulse and a voltage and outputs the sensor output value to the sensor unit 420. The sensor unit 420 appropriately outputs the value to the terminal computer 480.

The VICS receiver 430 includes a VICS antenna (not shown) and acquires information on traffic via the VICS antenna. Specifically, the VICS receiver 430 acquires traffic information (hereinafter referred to as VICS data) about traffic congestion, traffic accidents, constructions, traffic controls and the like from the VICS (not shown) by way of a beacon, FM multiplex broadcasting or the like. The VICS receiver 430 outputs the acquired information on traffic to the terminal computer 480.

The terminal operation unit 440 includes various operation buttons and operation knobs (not shown) to be used for input operations. The operation buttons and the operation knobs are used to input, for example, settings for the operation of the whole in-vehicle terminal 400. For example, the settings are on a type of information to be acquired and acquiring criteria, a destination, information retrieval, a driving status display (displaying of a traveling status of a vehicle), display switching, preferred time to arrive at the destination, notifying timing of guidance on the travel of the vehicle, a request for map information, a data transfer of map information and the like. Based on the input operation for the settings, the terminal operation unit 440 outputs a predetermined signal to the terminal computer 480 so as to apply the settings. The terminal operation unit 440 may not include the operation buttons and the operation knobs, but the settings may be input with a touch panel provided on the terminal display unit 450 or a remote controller or by voice.

The terminal display unit 450 is controlled by the terminal computer 480 and displays based on a signal of image data from the terminal computer 480. The image data includes image data of map information and retrieved information, TV image data received by a TV receiver (not shown), image data stored in an external device or a recording medium such as an optical disc, a magnetic disc or a memory card and read by a drive or a driver, and image data from the terminal storage 470. The terminal display unit 450 may be a liquid-crystal display panel, an organic EL (Electro Luminescence) panel, a PDP (Plasma Display Panel), a CRT (Cathode-Ray Tube), an FED (Field Emission Display) or an electrophoretic display.

The terminal sound output unit 460 may have a sound generator such as a speaker (not shown). The terminal sound output unit 460 is controlled by the terminal computer 480 and outputs a signal of, for example, sound data from the terminal computer 480 via the sound generator. Information output with sound includes information on the traveling direction or the traveling status of the vehicle and traffic conditions, which is notified to a passenger such as a driver and a fellow passenger for providing guidance on the travel of the vehicle or the travel for the destination. The sound generator may output TV audio data received by the TV receiver (not shown) or sound data stored in a recording medium or the terminal storage 470. The terminal sound output unit 460 may not be provided with the above-described sound generator but may use a sound generator equipped in the vehicle.

The terminal storage 470 stores acquired map information and other information in a readable manner. Similarly to the server storage 320, the terminal storage 470 may include a drive, a driver, or a semiconductor memory, or those in combination.

Similarly to the server computer 330, the terminal computer 480 may include a CPU and various programs run by an OS that is stored in the terminal storage 470 and controls the whole operation of the in-vehicle terminal 400, the programs including a current position recognizer 481 (a current position information acquirer), a destination information acquirer 482, a guidance notifier 483, a display controller 484 (a scale recognizer), a matching section 485, a travel route setting section 486 (a travel route retriever) also functioning as a map information acquirer and the scale recognizer, a request signal recognizer 487, an information converter 488 and a timer 489.

The current position recognizer 481 recognizes the current position of the vehicle. Specifically, the current position recognizer 481 calculates a plurality of current simulated positions of the vehicle based on the speed data and the azimuth data of the vehicle respectively output from the speed sensor and the azimuth sensor of the sensor unit 420. The current position recognizer 481 also recognizes current simulated coordinate values of the vehicle based on GPS data on the current position output from the GPS receiver 421 of the sensor unit 420. The current position recognizer 481 compares the calculated current simulated positions with the recognized current simulated coordinate values, calculates the current position of the vehicle on map information separately acquired and recognizes the current position. The current position recognizer 481 determines a slope angle and an altitude of the road on which the vehicle is driving based on the acceleration data output from the acceleration sensor, calculates the current simulated position of the vehicle and recognizes the current position. Thus, the current position of the vehicle can be accurately recognized even if the vehicle is on an intersection with an overpass or on an elevated highway where roads are overlaid in plan view. Further, even when the vehicle drives on a mountain road or a slope, the current position can be accurately recognized by correcting an error between a travel distance obtained only by the speed data and the azimuth data and an actual travel distance of the vehicle, the correction using the detected slope angle of the road. The current position recognizer 481 can recognize as the current simulated position not only the above-described current position of the vehicle but also a departure point that is an initial point set with the terminal input section 440. The information acquired by the current position recognizer 481 is appropriately stored in the terminal storage 470.

The destination information acquirer 482 acquires the destination information on the destination set by an input operation on the terminal operation unit 440 and recognizes the position of the destination. Information settable as the destination information includes information identifying a place such as coordinates of latitude and longitude, an address, a telephone number and the like. The destination information recognized by the destination information acquirer 482 is appropriately stored in the terminal storage 470.

The guidance notifier 483 notifies guidance on the travel of the vehicle based on travel route information or feature guidance information which are stored in the terminal storage 470 and retrieved in advance in response to the traveling status of the vehicle, such guidance being for assisting the travel of the vehicle. The guidance is notified by displaying an image on the terminal display unit 450 or by providing sound via the terminal sound output unit 460. For example, a predetermined arrow or a symbol may be displayed on a display screen of the terminal display unit 450, or sound guidance may be provided from the terminal sound output unit 460 like "Turn right in 700 meters ahead at intersection ○○○ toward △△△", "You have deviated from the travel route" or "Congestion ahead".

The display controller 484 appropriately controls the terminal display unit 450 to display information on the terminal display unit 450, thereby notifying a user of the information. The display controller 484 controls the terminal display unit 450 to display the map information of a region containing the current position in accordance with the settings set by the user or the scale rate set in advance with the current position substantially at the center of the map. The display controller 484 operates to display the map information and recognizes the scale rate on which the map information is to be displayed. As shown in FIG. 6, the display controller 484 displays the map information by rotating the map information such that the proceeding direction of the vehicle is shown upward on a display region of the terminal display unit, the map information rotated based on the azimuth data. The display controller 484 also controls the terminal display unit 450 to display various display windows for prompting the user to input settings via the terminal operation unit 440. FIG. 6 shows a guidance notifying display screen 451 of the terminal display unit 450 on which the map information is displayed and the guidance is notified. In the guidance notifying display screen 451 as shown in FIG. 6, a triangular icon 452 representing the current position of the vehicle is superposed on the map information on which an icon 453 representing a post office and an icon 454 representing a building are superposed. The guidance notifying display screen 451 is provided with a command button 455 for displaying a menu screen (not shown) in which settings of the in-vehicle terminal 400 can be input.

The matching section 485 performs the map matching process for displaying the current position recognized by the current position recognizer 481 based on the map information acquired from the terminal storage 470. As described above, the matching section 485 uses, for example, the matching data MM for the map matching process in which the current position information is appropriately corrected for displaying such that the position of the current position superposed on the map on the terminal display unit 450 is not deviated from a road constituting the map displayed on the terminal display unit 450. The matching section 485 performs a coordinate matching process for judging whether or not the point information of each nodes N of the matching data MM of the map information acquired from the terminal storage 470 is identical. Specifically, as described above, the matching section 485 acquires the point information of each node N of the matching data MM and reads the coordinate information of the point information. More specifically, the matching section 485 calculates the coordinate values such as latitude and longitude based on the coordinate values of the coordinate information and an offset amount. If nodes N have identical coordinate values, the matching section 485 reads flag information of the point information of the nodes N to determine whether or not the nodes N represent an identical point. When determining that the nodes N represent an identical point, the matching section 485 recognizes the links L containing the nodes N but constituting different link string block information intersect on the point, forming, for example, an intersection. When determining that the nodes N do not represent an identical point, the matching section 485 recognizes the links L containing the nodes N but constituting different link string block information intersect vertically apart from each other, forming, for example, an intersection with an overpass.

The travel route setting section 486 retrieves a travel route from the current position to the destination based on the setting information which is input by the user for setting the travel route and the map information stored in the terminal storage 470. The travel route includes driving routes for vehicles and routes retrieved in consideration for traveling in ways other than driving a vehicle such as on foot. The travel route setting section 486 computes to retrieve a route based on the setting information in consideration for the current traffic congestion status and predicted traffic congestion at a certain place on a predicted time at which the vehicle arrives at the place. The current traffic congestion status is obtained by acquiring the VICS data output from the VICS with the VICS receiver 430 and recognizing the data as a traffic jam status of a region containing the current position and the destination or a predetermined region around the current position. The traffic congestion is predicted by recognizing a traffic status at a certain place on a predicted time at which the vehicle arrives at the place based on statistical traffic information obtained by statistically processing, for example, past traffic statuses. The traffic congestion prediction may use other ways than such traffic statistics. The travel route setting section 486 retrieves a travelable road for a vehicle based on the current position, the destination, the information for travel route retrieval of the map information, the current traffic congestion status and the predicted traffic congestion, the travel route setting section 486 generating travel route information containing a quick travel route on which the traveling time to the destination becomes short, a short-distance travel route or a travel route for avoiding a traffic congestion or a place under traffic controls. The travel route setting section 486 computes a predicted required time for the travel from the current position to the destination that is a departure point of the travel route of the travel route information. When the travel route setting section 486 recognizes that map information containing the current position and the destination is not stored in the terminal storage 470 or stored map information is old, the travel route setting section 486 controls the terminal communicator 410 to acquire map information from the server unit 300 and to store the acquired map information in the terminal storage 470.

The request signal recognizer 487 recognizes a request for a transfer of the map information currently displayed on the terminal display unit 450 to the portable terminal 500 based on a predetermined request signal in accordance with an input operation on the terminal operation unit 440 by the user or a predetermined request signal sent from the portable terminal 500 via the network 200. When recognizing the request signal for the transfer, the request signal recognizer 487 outputs a predetermined signal to the information converter 488.

When recognizing the predetermined signal from the request signal recognizer 487 (when acquiring the request signal for the transfer of the map information), the information converter 488 converts the signal to a code such as a two-dimensional code which contains scale rate information on the scale rate on which the map information is displayed on the terminal display unit 450, the current position information recognized by the current position recognizer 481, the travel route information on the travel route set by the travel route setting section 486 or the like, the code being optically readable and in a data structure for a predetermined image. In this embodiment, an arrangement in which the two-dimensional code contains the travel route information will be described. However, since such arrangement is one example, only the current position information and the scale rate information may be contained in the two-dimensional code or the travel route information and other information may be contained on request. The information converter 488 displays the converted two-dimensional code on the terminal display unit 450 under the control of the display controller 484.

The two-dimensional code may be of a matrix method such as QR Code (Registered Trademark), a stacked barcode method or the like. The code may not be a two-dimensional code but a JAN (Japanese Article Number) code, an ITF (Interleaved Two of Five) code, a barcode in a plurality of lines, a two-dimensional code in a plurality of pieces or a numeral value as long as the code is optically readable. In consideration for a display region or an information amount, the two-dimensional code is one of appropriate arrangements.

The two-dimensional code may be displayed on a screen as shown in FIG. 7. FIG. 7 shows a transfer display screen 490 which is displayed on the terminal display unit 450 by the display controller 484 based on a form stored in advance in the terminal storage 470. The transfer display screen 490 includes a transfer map display region 491 that displays the map information of a region corresponding to a region of the map information displayed on the portable terminal 500 and a two-dimensional code display region 492. The transfer map display region 491 displays the map information of the predetermined region at the center of which the current position of the vehicle is displayed, the map information being displayed on the guidance notifying display screen 451 as shown in FIG. 6 based on the recognized display region from the portable terminal model data in the request signal, such that the north of the map information is directed upward in the display region of the terminal display unit 450. The transfer map display region 491 displays a map scale 491A (the scale rate) of the map information to be displayed. The map scale 491A is recognized based on the scale rate of the map information recognized by the display controller 484 and appropriately displayed on a superposing manner. The two-dimensional code display region 492 includes a code display region 492A in which image data of the two-dimensional code is displayed. The two-dimensional code display region 492 includes a command button 492B for operating the display controller 484 to display the code display region 492A in an enlarged manner, a command button 492C for displaying the code display region 492A in a reduced manner and a command button 492D for closing the transfer display screen 490 to display the guidance notifying display screen 451 shown in FIG. 6. Thus, based on the request signal for requesting a transfer of the map information, the information converter 488 operates the display controller 484 to display the transfer display screen 490 on the terminal display unit 450.

The timer 489 recognizes the current time based on a reference pulse such as an internal clock. The timer 489 appropriately outputs time information on the recognized current time.

(Arrangement of Portable Terminal)

As shown in FIG. 8, the portable terminal 500 may be a portable-type communication terminal such as a portable phone or a PHS (Personal Handyphone System) and may be used to continue the guidance in accordance with the traveling status of the vehicle based on the map information on the in-vehicle terminal 400. The portable terminal 500 may not be a portable phone or a PHS but may be a PDA (Personal Digital Assistant) or a portable-type personal computer such as a laptop personal computer. The portable terminal 500 continues the guidance by acquiring information (the two-dimensional code) which is output from the in-vehicle terminal 400 based on the transfer request for the map information which is sent to the in-vehicle terminal 400 and acquiring from the server unit 300 via the network 200 the map information used by the in-vehicle terminal 400 for the guidance. As shown in FIG. 9, the portable terminal 500 includes a portable terminal communication unit 510 as a terminal communicating section, a positioning section 520, a portable terminal operation unit 530, a portable terminal display unit 540 (as a terminal display), a sound collector 550, a portable terminal sound output unit 560, an image pickup unit 570, a portable terminal storage unit 580 and a portable terminal computer 590 (as a computer).

The portable terminal communication unit 510 is connected to the server unit 300 in an information sending/receiving manner via a base station of a portable phone line network of the network 200. The portable terminal communication unit 510 sends and receives information by processing a signal from the portable terminal computer 590 or from an outside component such as the server unit 300 under the control of the portable terminal computer 590.

The positioning section 520 includes a GPS receiver (not shown) or the like. The positioning section 520 computes simulated coordinate values of the portable terminal 500 based on electric navigation waves and outputs the simulated coordinate values as positioning data (information on positions) to the portable terminal computer 590. The positioning section 520 may not include a GPS receiver but may include an azimuth sensor and a magnetic sensor or may compute the simulated coordinate values using distances from a plurality of base stations based on communication waves.

As shown in FIG. 8, the portable terminal operation unit 530 includes operation buttons 531 and operation knobs for input operation. The operation buttons 531 and the operation knobs are used to input, for example, settings for the operation of the whole portable terminal 500. For example, the settings are for call operation, the operation of application software, a request for continuous guidance on the in-vehicle terminal 400. Based on the input operation for the settings, the portable terminal operation unit 530 outputs a predetermined signal to the portable terminal computer 590 so as to apply the settings. Similarly to the terminal operation unit 440, the portable terminal operation unit 530 may not include the operation buttons 531 and the operation knobs, but the settings may be input with a touch panel provided on the portable terminal display unit 540 or by voice.

The portable terminal display unit 540 is controlled by the portable terminal computer 590 and displays image data based on the signal from the portable terminal computer 590. The image data may include not only a telephone number for a call, operating screen or waiting screen of application software and the map information but also TV image data and image data stored in a detachable recording medium such as a memory card or a HD when a TV receiver is provided. Similarly to the terminal display unit 450, the portable terminal display unit 540 includes a liquid crystal panel, an organic EL panel, a PDP, a CRT, an FED and an electrophoretic display panel.

As shown in FIG. 8, the sound collector 550 may have a microphone 551. The sound collector 550 collects speech of the user for calls or voice input with the microphone 551 and outputs to the portable terminal computer 590 as sound data.

Similarly to the terminal sound output unit 460, the portable terminal sound output unit 560 is provided with a sound generator such as a speaker (not shown). The portable terminal sound output unit 560 is controlled by the portable terminal computer 590 and outputs a signal of, for example, sound data from the portable terminal computer 590 via the sound generator. The information output as sound includes input operation sound in response to the input operation such as a speech on a called party or an input on the portable terminal operation unit 530, sound data provided by application software, guidance on the travel of the user carrying the portable terminal 500 or the like. The portable terminal sound output unit 560 may output TV audio data received by the TV receiver or sound data stored in a detachable recording medium.

The image pickup unit 570 may be a so-called CCD (Charge Coupled Devices) camera, a CMOS (Complementary Metal Oxide Semiconductor) camera or the like. The image pickup unit 570 is controlled by the portable terminal computer 590, converts an image optically acquired by capturing to image data and outputs the image data to the portable terminal computer 590.

The portable terminal storage unit 580 stores information such as address information for a connection with the server unit 300 in acquiring map information and the acquired map information in a readable manner. Similarly to the server storage 320 and the terminal storage 470, the portable terminal storage unit 580 may include a drive, a driver or a semi-conductor memory, or those in combination.

Similarly to the server computer 330 and the terminal computer 480, the portable terminal computer 590 may include a CPU and various programs run by an OS that is stored in the portable terminal storage unit 580 and controls the whole operation of the portable terminal 500 such as an arrangement for functioning as a portable communication terminal that processes for calls, a terminal position recognizer 591 as a position information acquirer, a terminal display controller 592, a request signal generator 593, a code analyzer 594 as an information acquirer, a map information reception controller 595 or the like.

The terminal position recognizer 591 acquires the simulated coordinate values computed by the positioning section 520 and recognizes the current position of the portable terminal 500. The simulated coordinate values may be recognized as the current position after being corrected in the map matching process in which the map information is used.

The terminal display controller 592 appropriately controls the portable terminal display unit 540 to display information on the portable terminal display unit 540, thereby notifying the user of the information. The terminal display controller 592 processes the image data such as a telephone number for a call, operating screen or waiting screen of application software, the map information, TV image data when a TV receiver is provided and image data stored in a detachable recording medium such as a memory card or a HD in order to display the data. In displaying the map information, the terminal display controller 592 controls the portable terminal display unit 540 to display the map information of a region containing the current position in accordance with the settings set by the user or the scale rate set in advance with the current position substantially at the center of the map as shown in FIG. 8. As shown in FIG. 8, in displaying the map information, the terminal display controller 592 displays the map information with the north directed upward in the display region of the portable terminal display unit 540.

When recognizing a predetermined input operation on the portable terminal operation unit 530 by the user, the request signal generator 593 generates a signal for requesting continuation of the guidance. Specifically, the request signal generator 593 generates a request signal for requesting a transfer of information of the current position of the vehicle currently receiving the guidance by the in-vehicle terminal 400 based on the map information, the travel route information and the map information in use in the guidance to the portable terminal 500. The request signal generator 593 controls the portable terminal communication unit 510 such that the generated request signal is sent to the in-vehicle terminal 400. The request signal may be sent by the portable terminal communication unit 510 via the portable phone line network of the network 200 or may be directly sent to the in-vehicle terminal 400 as infrared light.

The code analyzer 594 analyzes the two-dimensional code captured by the image pickup unit 570 and extracts information described in the two-dimensional code by the information converter 488 of the in-vehicle terminal 400. Specifically, the code analyzer 594 acquires the scale rate information on the scale rate of the map information, the current position information on the current position of the vehicle which is recognized by the current position recognizer 481 and the travel route information on the travel route set by the travel route setting section 486, these kinds of information having been converted in a two-dimensional code. These kinds of information are appropriately stored in the portable terminal storage unit 580. When recognizing that no information can be acquired from the two-dimensional code, the code analyzer 594 may display on the portable terminal display unit 540 a message notifying that no information can be acquired or a message for prompting a re-capturing of the two-dimensional code.

The map information reception controller 595 controls the portable terminal communication unit 510 such that predetermined map information is distributed from the server unit 300. Specifically, the map information reception controller 595 performs the control such that the map information of a region at least containing the current position of the current position information in a scale corresponding the scale rate of the scale rate information acquired by the code analyzer 594 is acquired from the server storage 320 of the server unit 300. The map information may be distributed by generating a map request signal including the scale rate information, the current position information, identification information such as address information identifying the destination (the portable terminal 500) and sending the generated map request signal from the portable terminal communication unit 510 to the server unit 300. The map information reception controller 595 acquires the map information that is sent from the server unit 300 and received by the portable terminal communication unit 510, appropriately stores the map information in the portable terminal storage unit 580 and displays the map information by the terminal display controller 592.

[Operation of Navigation System]

Figure 10:
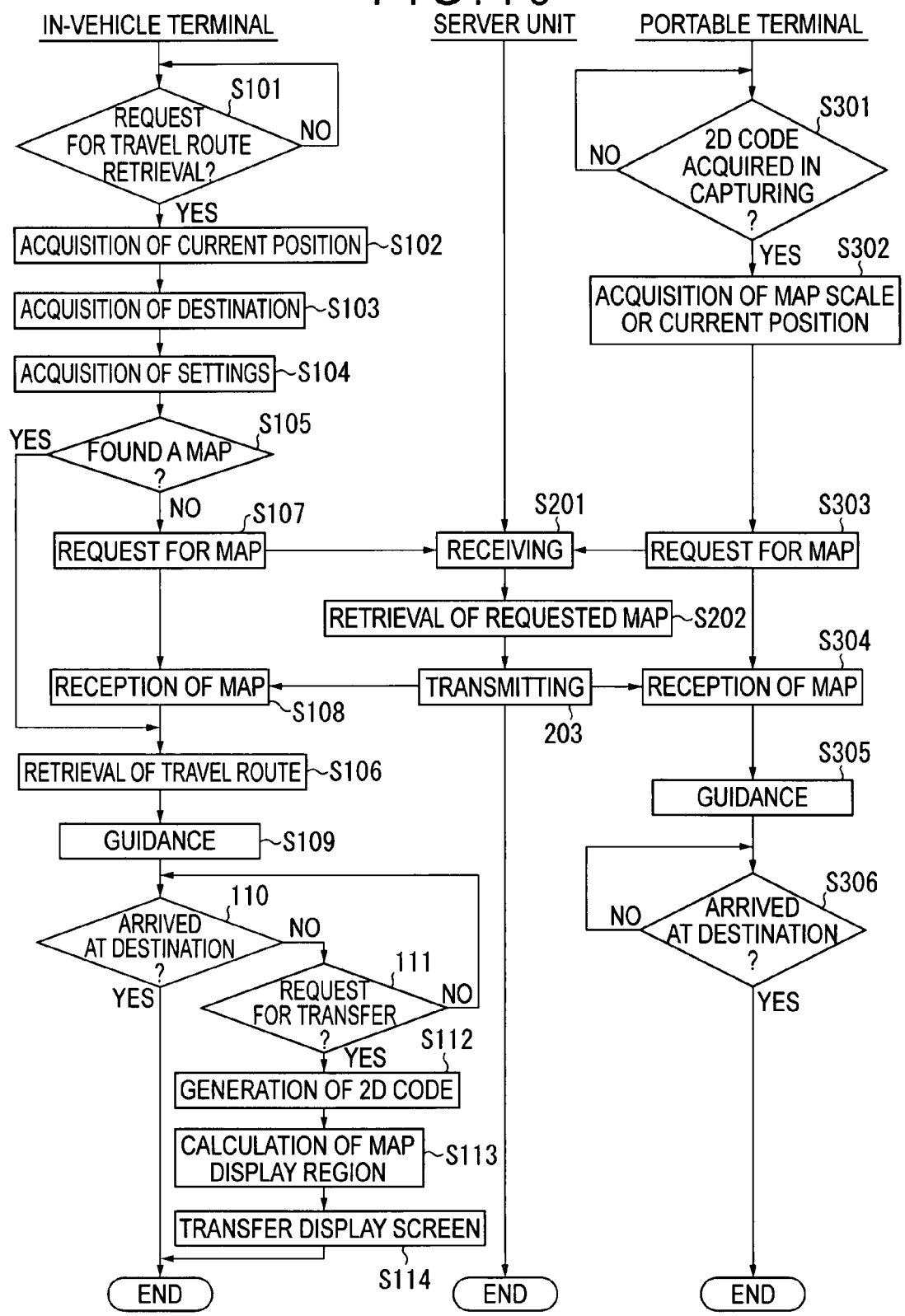
FIG. 10 is a flowchart showing an operation of the navigation system of the embodiment.

The operation of the navigation system 100 will be described with reference to the attached drawings. FIG. 10 is a flowchart showing the operation of the navigation system.

The user in the vehicle turns on the in-vehicle terminal 400 such that electricity is supplied from a battery equipped to the vehicle. With the electricity, the in-vehicle terminal 400 becomes standby for operation settings. The terminal computer 480 operates the display controller 484 to display on the terminal display unit 450 a menu screen for prompting the user to input settings for the in-vehicle terminal 400.

When the user inputs with the terminal operation unit 440 a request for guidance (a request for retrieving a travel route) on the menu screen in the standby status and the terminal computer 480 recognizes the request for retrieving the travel route (Step S100), the terminal computer 480 acquires the current position information on the current position from the current position recognizer 481 (Step S102). The terminal computer 480 controls the display controller 484 to display on the terminal display unit 450 a display screen for prompting an input of information necessary for a travel route retrieval such as the destination and settings for placing the highest priority on, for example, the shortest distance or the shortest time or the smallest cost or necessity of traffic congestion prediction. The terminal computer 480 acquires from the destination information acquirer 482 the destination information on the destination set on the display screen (Step S 103) and acquires the setting information on the input settings (Step S 104). The current position information, destination information and the setting information that are acquired by the terminal computer 480 are appropriately stored in the terminal storage 470.

The terminal computer 480 operates the travel route setting section 486 to judge whether a map of a region containing the current position and the destination is stored (Step S105). When recognizing that map information of the predetermined region is stored in the terminal storage 470, the travel route setting section 486 performs a route retrieval using the map information (Step S106). The travel route setting section 486 retrieves a travel route from the current position to the destination based on the current position information, the destination information and the setting information in consideration for current traffic congestion information or traffic congestion prediction information based on the VICS data acquired with the VICS receiver 430.

On the other hand, in Step S105, when it is judged that no corresponding map information is stored, the terminal computer 480 generates map request information and controls the terminal communicator 410 to send the map request information to the server unit 300 (Step S107). In Step S107, when the server unit 300 receives the map request information sent from the in-vehicle terminal 400 (Step S201), the server computer 330 acquires a map request signal from the map request recognizer 331, recognizes the request sender (the in-vehicle terminal 400) based on the map request signal and recognizes conditions of the required map information. The server computer 330 retrieves with the map information distributor 332 requested map information from the server storage 320 based on the information identifying the requested map information status of the map request signal acquired by the map request recognizer 331 such as a scale rate, a region or a current position (Step S202). The map information distributor 332 operates such that the retrieved map information is sent by the server communicator 310 via the network 200 to the sender (the in-vehicle terminal 400) based on the information identifying the sender of the map request signal (Step S203). When the in-vehicle terminal 400 receives the map information sent in Step S203 (Step S108), the process proceeds to Step S106 in which the travel route setting section 486 performs a route retrieval.

The terminal computer 480 operates the display controller 484 to control the terminal display unit 450, displays an icon on the map information, the icon representing the current position of the vehicle based on the current position information, and appropriately superposes the set travel route, the current traffic congestion status, the traffic congestion prediction, the required time or the like on the map information. The terminal computer 480 recognizes the travel status of the vehicle based on the data output from the sensor unit 420 and notifies the user of guidance for the travel of the vehicle based on the travel status and travel guidance information contained in the travel route information which are recognized by the guidance notifier 483 by displaying or outputting with sound, thereby guiding the travel of the vehicle (Step S109). During the guidance in Step S109, the current position recognizer 481 judges whether or not the current position is the destination (Step S110). In Step S110, when it is judged that the current position is the destination, the terminal computer 480 ends the guidance.

On the other hand, in Step S110, when the current position recognizer 481 judges that the current position is not the destination, it is judged whether or not the request signal recognizer 487 recognizes a request signal for a transfer of the map information displayed on the terminal display unit 450 to the portable terminal 500 (Step S111). When it is judges that the request signal recognizer 487 recognizes no request signal, the process returns to Step S110 in which the guidance is continued. On the other hand, in Step S111, the request signal recognizer 487 recognizes a request signal, a predetermined signal for notifying the transfer request is output to the information converter 488. When the information converter 488 recognizes that the predetermined signal from the request signal recognizer 487 (the request signal for a transfer of the map information), the information converter 488 generates information on the two-dimensional code which contains the scale rate information on the scale rate of the map information displayed on the terminal display unit 450, the current position information recognized by the current position recognizer 481, the travel route information on the travel route set by the travel route setting section 486 or the like. The information converter 488 recognizes the type of the portable terminal 500 to which the map information is to be transferred based on the request signal. In other words, the information converter 488 recognizes a region displayable on the portable terminal display unit 540 of the portable terminal 500 of the type based on the model information contained in the request signal. The information converter 488 recognizes a display region of the map information with the current position of the vehicle at the center of the map information displayed on the terminal display unit 450 and with the north of the map directed upward in the display region of the portable terminal display unit 540 (Step S113). The information converter 488 generates a transfer display screen as shown in FIG. 7 and controls the display controller 484 to display the transfer display screen on the terminal display unit 450, ending the process (Step S114).

When the two-dimensional code that is displayed on the terminal display unit 450 of the in-vehicle terminal 400 in Step S114 is captured by the image pickup unit 570 of the portable terminal 500 (Step S301), the portable terminal computer 590 analyzes the two-dimensional code with the code analyzer 594 and acquires the scale rate information, the current position information, the travel route information or the like (Step S302). The portable terminal computer 590 operates the map information reception controller 595 to acquire the map information of the region which corresponds to the scale rate of the scale rate information acquired by the code analyzer 594 and contains at least the current position of the current position information from the server storage 320 of the server unit 300. Specifically, the map request signal including the scale rate information, the current position information and the identification information such as address information identifying the party to receive (the portable terminal 500) is generated and sent to the server unit 300 (Step S303).

In Step S303, when the server unit 300 receives the map request information sent from the portable terminal 500 (Step S201), the server computer 330, as described above, acquires the map request signal from the map request recognizer 331 and recognizes the request sender (the portable terminal 500) and conditions of the requested map information based on the map request signal. In Step S202, the map information distributor 332 retrieves and reads out the map information from the server storage 320 based on the scale rate and the current position which are information identifying a status of the map information of the map request signal. In retrieving the map information, when no map information on the scale rate corresponding to the scale rate to be used for the portable terminal 500 (such as 100 m scale or 200 m scale) is stored, the map information of the closest scale rate is read out. In Step S203, the map information distributor 332 operates the server communicator 310 to send the read map information via the network 200 to the request sender (the portable terminal 500) based on the information identifying the sender of the map request signal. When the portable terminal 500 receives the map information sent in Step S203 (Step S304), the map information reception controller 595 of the portable terminal computer 590 operates such that the received map information is stored in the portable terminal storage unit 580 and operates the terminal display controller 592 to superpose the travel route on the map information based on the travel route information. The portable terminal computer 590 recognizes the current position of the portable terminal 500 based on the simulated coordinate values calculated by the positioning section 520 and operates the terminal display controller 592 such that the current position is displayed substantially at the center, thereby providing the guidance (Step S305).

Similarly to the in-vehicle terminal 400, the guidance by the portable terminal 500 may be notified by being displayed or output with sound. When the link information is not contained in the map information sent from the server unit 300, the guidance may be provided in a simple manner that the map information is moved as the user travels. When the destination is not contained in the map information acquired from the server unit 300 and a not-acquired region of the map is to be displayed in response to the travel of the user, the map request information may be appropriately generated and the region to be displayed of the map information may be received from the server unit 300.

During the guidance in Step S109, the portable terminal computer 590 judges whether or not the current position is the destination with the current position recognizer 481 (Step S306). In Step S306, when it is judged that the current position is the destination, the guidance is continued. In Step S306, when it is judged that the current position is the destination, the process is ended.

[Effects and Advantages of Navigation System]

As stated above, in the above-described embodiment, the in-vehicle terminal 400 operates the display controller 484 to display a region of the map information which contains the current position recognized by the current position recognizer 481 on the terminal display unit 450 and recognizes the scale rate of the map information. When the in-vehicle terminal 400 recognizes with the request signal recognizer 487 a request signal for a transfer of the currently displayed map information to the portable terminal 500, the information converter 488 converts the request signal to the two-dimensional code in a predetermined data structure of an image, the code containing the scale rate information on the scale rate of the map information and the current position information on the current position of the vehicle in an optically readable manner, the information converter 488 operating the display controller 484 to display the code as an image on the terminal display unit 450. Accordingly, since the portable terminal 500 reads out the two-dimensional code with the code analyzer 594 that optically reads information from an image acquired by the image pickup unit 570 and the capturing, the map information currently displayed in the guidance on the in-vehicle terminal 400 can be displayed on the portable terminal 500 in a similar manner. Compared with an arrangement in which a comparatively large amount of data of the map information is directly transferred, the map information based on the current position of the vehicle can be displayed even on the portable terminal 500 that has a comparatively limited information processing capacity in a similar manner to that on the in-vehicle terminal 400. Since the guidance on the in-vehicle terminal 400 is continued on the portable terminal 500, the map information is displayed in a similar display manner, so that the guidance can be continued well on a separate terminal without giving the user a feeling of strangeness, thereby assisting the user well and enhancing the usability.

The image pickup unit 570 of the portable terminal 500, which also includes the portable terminal display unit 540 that displays the map information, the portable terminal communication unit 510 and the portable terminal computer 590 in which a region of the map information on a corresponding scale rate based on the scale rate information and containing at least the current position based on the current position information is received via the network 200 and displayed on the portable terminal display unit 540, captures to extract the scale rate information and the current position information to be converted to the two-dimensional data. Comparatively large amount of information such as a two-dimensional code can be described and the portable terminal 500 may be a general camera-equipped portable phone including the image pickup unit 570, so that the guidance can be continued smoothly without giving the user a feeling of strangeness.

The portable terminal 500 acquires the scale rate information and the current position information by capturing with the image pickup unit 570 a two-dimensional code containing the scale rate information of the map information and the current position information of the vehicle and receives a region of the map information on a corresponding scale rate and containing at least the current position via the network 200 from the server unit 300 to display on a screen. Accordingly, it is possible to continue the guidance without giving the user a feeling of strangeness on the portable terminal 500 with the image pickup unit 570 such as a general camera-equipped portable phone that can extract information from the two-dimensional code. For example, even when the user gets off the vehicle to travel, the guidance can be continued in a similar display manner to the in-vehicle terminal 400, thereby well assisting the user for traveling.

The portable terminal 500 may acquire the map information from the server unit 300 based on the scale rate information and the current position information. Hence, it is possible to easily structure the system by using the structure of the server unit 300 that distributes the map information. Even when the in-vehicle terminal 400 and the portable terminal 500 use different scales (when the in-vehicle terminal 400 identifies a to-be-displayed map information pattern with scale rates such as 1/1250 or 1/2500 and the portable terminal 500 identifies a to-be-displayed map information pattern with scales such as 100 m scale or 200 m scale), the server unit 300 with comparatively large storage capacity and high processing ability easily employs the arrangement, thereby easily continuing the guidance without giving the user a feeling of strangeness.

In transferring the data, the in-vehicle terminal 400 displays a region of the map information corresponding to the display region of the map information displayed on the portable terminal display unit 540 of the portable terminal 500 as the transfer display screen 490. Accordingly, the user can confirm a after-transfer display status to the portable terminal 500, thereby enhancing the usability. Further, the transfer display screen 490 is adapted to display in two screens together with the two-dimensional code, so that the user can confirm the process of the map information transfer on one screen and the after-transfer display status on the other screen, thereby enhancing the usability.

The region of the map information corresponding to the after-transfer display status of the portable terminal 500 is displayed such that the north is directed upward of the display region of the portable terminal display unit 540. In the in-vehicle terminal 400, the guidance for assisting the travel is provided by rotating the map information such that the proceeding direction is directed upward in the display region based on the azimuth data from the azimuth sensor. The portable terminal 500 is adapted to be carried, the azimuth changes depending on how the portable terminal 500 is carried and it is difficult to recognize the proceeding direction. Further, such portable-type components often have limited functions due to downsizing and weight reduction. Accordingly, the portable terminal 500 displays with the north directed upward in the display region. Hence, even when the north of the map information displayed on the terminal display unit 450 of the in-vehicle terminal 400 is not directed upward in the display region, the information is converted such that the north is directed upward on the display region and displayed on the transfer display screen 490. Therefore, the display status after transferring can be easily recognized.

The two-dimensional code is used as a transfer code. Accordingly, it is possible to easily display the scale rate or the current position in a comparatively small display region, so that the scale rate and the current position of the in-vehicle terminal 400 can be easily acquired on the portable terminal 500 which may often have limited functions. Further, since the two-dimensional code which is capable of containing a large amount of information is used, other information than above-exemplified information such as the destination information or the travel route information can be easily contained and transferred for the use in guidance, thereby enhancing the usability. Accordingly, the user can obtain good assistance in traveling.

In addition to the scale rate information and the current position information, the travel route information is described in the two-dimensional code. Accordingly, even when travel route retrieval is not available on the portable terminal 500 which may often have limited functions, the travel route can be displayed, thereby providing good assistance.

Even when there is no map information on a scale corresponding to the scale rate of the map request or the scale of the map information displayed on the portable terminal 500, or when there is no scale rates equal to that of the requested map information, the server unit 300 retrieves and distributes map information on a scale or a scale rate close to the requested scale rate. Accordingly, the arrangement is usable even when the in-vehicle terminal 400 and the portable terminal 500 use different processing patterns or when the portable terminal 500 can not display certain types of map information due to model types, thereby enhancing the versatility.

The portable terminal 500 is provided with the positioning section 520 which computes the current position of the portable terminal 500, so that even when the user is away from the vehicle, guidance can be provided in correspondence with the travel status based on the current position in other words a region of the map information displayed on the portable terminal 500 is changed. Hence, it is possible to well notify a travel status even at a position apart from the vehicle, thereby providing good assistance.

When the map information acquired by the portable terminal 500 does not contain a region to the destination, the lacking region can be appropriately acquired. Accordingly, it is possible to easily provide suitable guidance in correspondence with the travel status of the traveling portable terminal 500. It is not necessary to collectively acquire a region of the map information to the destination, so that the storage capacity of the portable terminal storage unit 580 of the portable terminal 500 can be effectively used, thereby easily preventing an increase in size or processing time.

The terminal computer 480 and the portable terminal computer 590 are programs used with a CPU (Central Processing Unit), so that installing the programs realizes that the guidance is continued without giving the user a feeling of strangeness, thereby easily enlarging the use thereof. The programs may be recorded on a recording medium such that the terminal computer 480 or the portable terminal computer 590 (each as a computer) reads the data, so that the guidance can be continued without giving the user a feeling of strangeness and the programs can be easily handled, thereby easily enlarging the use thereof. The computer according to the embodiment of the present invention is not limited to one computer but may be a configuration in which a plurality of computers is combined in a network, an element such as the above-described CPU or a microcomputer, a circuit board on which a plurality of electric components is mounted, or the like.

MODIFICATIONS OF EMBODIMENT

Although the present invention has been described above with reference to the embodiment, the scope of the invention is not limited thereto and includes various modifications as long as an object of the present invention can be achieved.

The mobile body is not limited to a vehicle but may be an aircraft, a ship or a body which can travel. The in-vehicle terminal 400 is not limited to an in-vehicle type that may be equipped in a vehicle but may be a portable type. The portable terminal 500 is not limited to a type that has a call function such as a portable phone or a PHS but may be any portable communication terminal such as a laptop personal computer that can acquire the map information through communication.

The terminal communicator 410 of the in-vehicle terminal 400 may be a portable communication terminal such as a portable phone or a PHS. Specifically, the portable communication terminal may be connected to the in-vehicle terminal 400, and the map information or the like may be acquired from the server unit 300 via the portable communication terminal for the guidance in response to the travel status of the vehicle. When the user gets off the vehicle and travels on foot or by bicycle, the portable communication terminal may be detached from the in-vehicle terminal 400 to be used as the portable terminal 500 such that the user can obtain the guidance on the travel. Thus, the navigation system 100 can be simply structured. The in-vehicle terminal 400 may be equipped to a portable communication terminal or the portable terminal 500 may be equipped on a vehicle in a detachable manner. When the user gets off the vehicle and travels, the user can take out to carry the portable terminal 500. When traveling in a group, one portable terminal 500 may generate the two-dimensional code like the in-vehicle terminal 400 for transferring the data to another portable terminal 500 and the other portable terminal 500 may capture the code.

The in-vehicle terminal 400 has been described above taking a communication type as an example, which appropriately acquires the map information from the server unit 300. However, the in-vehicle terminal 400 may be a standalone type in which the map information is recorded in a recording medium such as a CD (Compact Disc), a DVD (Digital Versatile Disc) or an HD. The function of the communication type may not be limited to acquisition of the map information from the server unit 300. The communication type may have a function for sending the current position information, the destination information or the setting information to the server unit 300 such that the server unit 300 retrieves a travel route and receiving the travel route information together with the map information. In addition, music information, information on shops or other information may be received.

The above-described portable terminal 500 has an arrangement in which the map information is acquired from the server unit 300 based on the scale rate information and the current position information which are acquired from the two-dimensional code. However, a comparatively light amount of data of the map information to be displayed on the portable terminal 500 may be stored in the terminal storage 470 of the in-vehicle terminal 400 such that the data can be retrieved from the terminal storage 470. By employing such an arrangement, the server unit 300 can be omitted, thereby simplifying the system structure.

Figure 11:
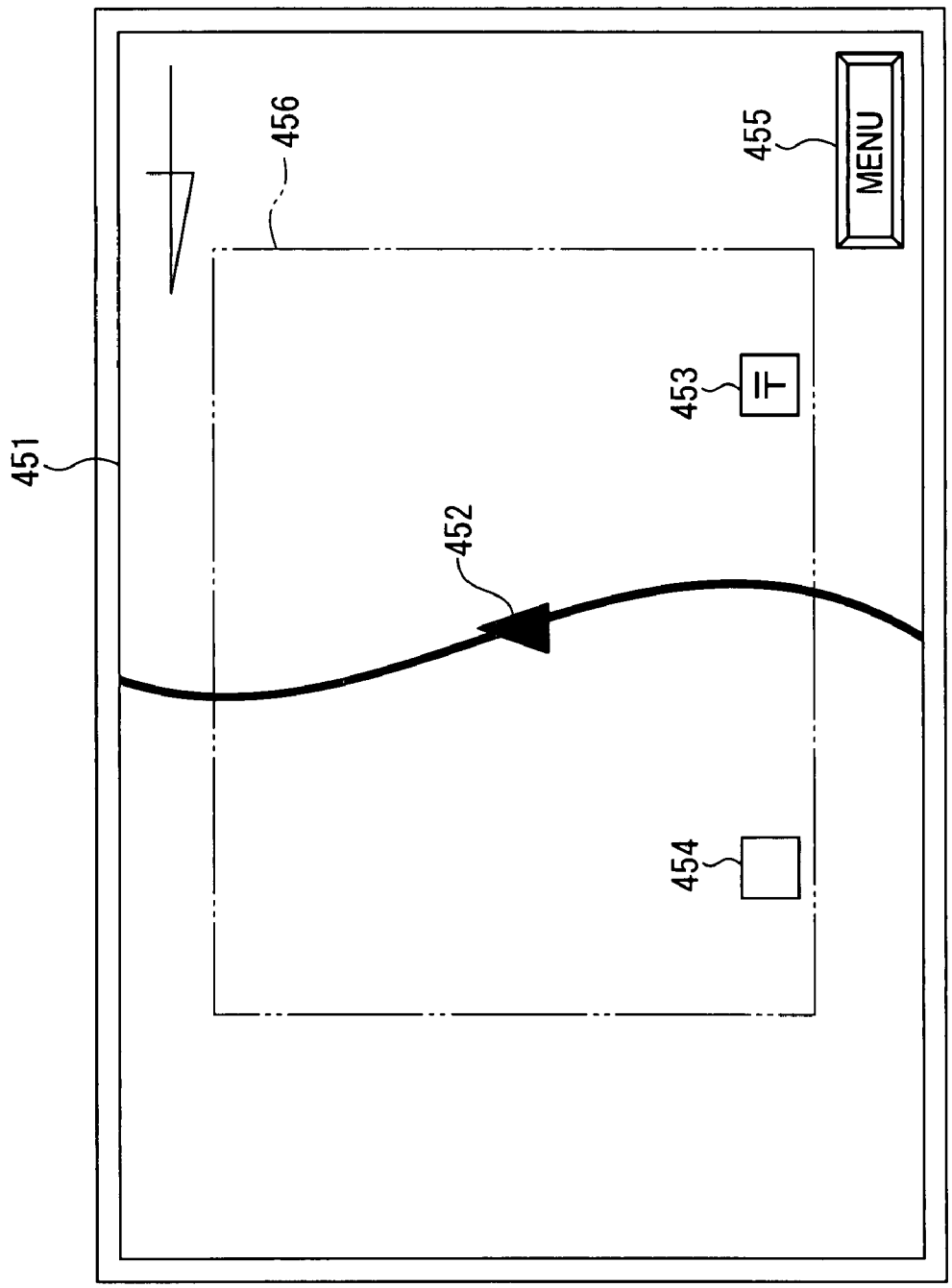
FIG. 11 is an explanatory illustration showing a display pattern of map information on a terminal display unit for showing a display status of the map information after transferring of another embodiment of the invention.

In displaying the two-dimensional code, the above-exemplified transfer display screen 490 also displays the after-transfer map information in one of the two screens. However, as shown in FIG. 11, before displaying the two-dimensional code, a region 456 corresponding to the after-transfer display region may be superposed on the map information. With the arrangement, it can be easily recognized which part of the current display on the terminal display unit 450 is selected to be displayed. In FIG. 11, the region 456 may be superposed as mentioned above or, for example, the other part of the region may be displayed to be dark such that the after-transfer display region can be recognized.

In the above description, the travel route information is also contained in the two-dimensional code, but only the scale rate information and the current position information may be contained such that the map information can be acquired by the portable terminal 500. In other words, with the scale information and the current position information, it is possible to provide the user with guidance on the travel with the portable terminal 500 based on the map information. Note that the destination information may be alternatively contained in place of the travel route information. This arrangement can facilitate the travel to the destination. Further, by arranging such that the portable terminal 500 can perform a travel route retrieval from the current position to the destination, the portable terminal 500 can set the travel route without the contained travel route information. This arrangement can be utilized in a case where a travel route for walking can not retrieved with the in-vehicle terminal 400.

As described above, even when the map information acquired by the portable terminal 500 does not contain a region to the destination, the lacking region can be appropriately acquired. However, collective acquisition may be applicable. In this case, to change a region displayed in response to the travel, it is only necessary to display already acquired map information, so that the process time required to acquire the map information and display can be reduced, thereby providing information in a quick process. It is also possible to display the map information containing even the destination by display switching, thereby easily enhancing the usability.

In the above-described embodiment, the in-vehicle terminal 400 can take the current traffic congestion information and the traffic congestion prediction into consideration, but traffic congestion may not be taken into consideration. On the other hand, the guidance may be provided with consideration for the travel status of the mobile body such as a control for road construction, a landslide, weather conditions like an approaching typhoon, a storm or a snowstorm. In other words, the guidance may be provided with consideration for various conditions that may affect the driving of the vehicle (the travel status of the mobile body). The portable terminal 500 may be capable of performing a travel route retrieval or providing guidance with consideration for traffic congestion information and the like. In retrieving the travel route, the user may be provided with a plurality of candidate travel routes and select one therefrom.

The current position may be recognized by the in-vehicle terminal 400 or the portable terminal 500 using another way than the above-described arrangement. The in-vehicle terminal 400 may recognize the current position in any way. The in-vehicle terminal 400 may only have the positioning section 520 like the portable terminal 500 or may also have another component for recognizing the current position in addition to the positioning section 520. For example, the current position may be recognized based on the strength of electric waves from a plurality of base stations.

As a way for requesting a transfer, the request may not be input on a terminal operation unit, as described above. However, the transfer may be performed on receiving the transfer request or request information generated by the request signal generator 593 via the network 200 from the portable terminal 500.

In displaying the point information on the map, for displaying the point information contained in the two-dimensional code and the actual position such that the user can easily understand, the map information may be displayed with an image containing the two-dimensional code of the point information. Such image may be displayed at a corresponding position on the map as an alternate for the current position icon or as an icon near the current position icon or the image may be superposed on the map information.

The two-dimensional code may be output in various manners like following examples. The two-dimensional code may pop up or displayed in a balloon when the portable terminal operation unit 530 of the portable terminal 500 (e.g. a mouse) or the image pickup unit 570 is held over the code. The two-dimensional code may be printed out in accordance with a printout request or may be printed out together with the map information in accordance with a printout request for the map information. The two-dimensional code may be printed out in a balloon on the printed map. The two-dimensional code may be displayed as a see-through icon. When a plurality of travel routes is retrieved, each two-dimensional code containing travel route information may be superposed for each travel route next to each other or may be displayed in a balloon. When the travel routes are set to be displayed in different colors, the two-dimensional codes may be displayed in corresponding colors.

In addition to the above examples, the structure or the procedure for implementing the present invention in an embodiment may vary as long as an object of the invention can be achieved.

ADVANTAGES OF EMBODIMENT

As described above, the in-vehicle terminal 400 operates the display controller 484 to display on the terminal display unit 450 the region of the map information, the region containing the current position recognized by the current position recognizer 481, and the in-vehicle terminal 400 recognizes the scale rate of the displayed map information. When the request signal recognizer 487 of the in-vehicle terminal 400 recognizes a request signal for a transfer of the currently displayed map information to the portable terminal 500, the information converter 488 converts the data to the two-dimensional code in a predetermined data structure of an image, the code containing the scale rate information on the scale rate of the map information and the current position information on the current position of the vehicle in an optically readable manner, and the display controller 484 displays the code as an image on the terminal display unit 450. Accordingly, since the portable terminal 500 reads out the two-dimensional code with the code analyzer 594 that optically reads information from an image acquired by the image pickup unit 570 and the capturing, the map information currently displayed in the guidance on the in-vehicle terminal 400 can be displayed on the portable terminal 500 in a similar manner. Further, even when the guidance is taken over from the in-vehicle terminal 400 to be continued on the portable terminal 500, the map information can be continuously displayed on a different terminal in a similar manner without giving the user a feeling of strangeness, thereby continuously assisting the user well in traveling and enhancing the usability.

The portable terminal 500 acquires the scale rate information and the current position information by capturing with the image pickup unit 570 a two-dimensional code containing the scale rate information of the map information and the current position information of the vehicle and receives a region of the map information on a corresponding scale rate and including at least the current position via the network 200 from the server unit 300 to display on a screen. Accordingly, it is possible to continue the guidance without giving the user a feeling of strangeness on the portable terminal 500 with the image pickup unit 570 such as a general camera-equipped portable phone that can extract information from the two-dimensional code. For example, even when the user gets off the vehicle to travel, the guidance can be continued in a similar display manner to the in-vehicle terminal 400, thereby assisting the user well for traveling.

INDUSTRIAL APPLICABILITY

The present invention provides a travel guiding device, a terminal travel guiding device, a portable travel guiding device, a travel guiding system, a travel guiding method, a travel guiding program and a recording medium recording the program which are for providing guidance on a travel of a mobile body.

The invention claimed is:

1. A travel guiding device, comprising:
a map information acquirer which acquires map information;
a current position information acquirer which acquires current position information on a current position of a mobile body;
a display controller which performs control such that a region of the map information is displayed on a display, the region containing the current position, the display controller recognizing a scale rate of the map information displayed on the display;
a request signal recognizer which recognizes a request signal for requesting a transfer of the map information; and
an information converter which recognizes the request signal, generates a code having a data structure defining a predetermined image, the code containing scale rate information on the scale rate of the map information and the current position information, the code being optically readable, the information converter operating the display controller to display the code as the image on the display.

2. The travel guiding device according to claim 1, wherein the information converter converts the scale rate information and the current position information as the code having the data structure of the predetermined image into acquirable image data by capturing by an image pickup unit of a portable travel guiding device that includes: the image pickup unit; a terminal display which displays the map information; a terminal communicating section which sends and receives information via a network; and a terminal computer that controls the terminal communicating section to receive the region of the map information which corresponds to the scale rate of the scale rate information and contains at least the current position from a storage storing the map information via the network, the terminal computer also controlling the terminal display to display the region, based on the scale rate information and the current position information.

3. The travel guiding device according to claim 2, wherein the information converter controls the display controller to display the region of the map information which corresponds to the region of the map information to be displayed on the terminal display of the portable travel guiding device to which the map information is transferred in a superposing manner on the map information displayed on the display.

4. The travel guiding device according to claim 2, wherein the information converter controls the display controller to display in a two-screen manner on the display the code and the region of the map information which corresponds to the region of the map information to be displayed on the terminal display of a transfer destination to which the map information is transferred.

5. The travel guiding device according to claim 4, wherein the information converter displays the map information such that the north of the map information displayed on the display is directed upward on a screen.

6. The travel guiding device according to claim 1, wherein the code generated by the information converter is a two-dimensional code.

7. The travel guiding device according to claim 1, comprising:
a destination information acquirer which acquires destination information on a destination of a travel, wherein
the information converter generates a code containing the scale rate information, the current position information and the destination information.

8. The travel guiding device according to claim 1, comprising:
a travel route retriever which retrieves a travel route from the current position to the destination based on the map information, wherein
the information converter generates a code containing the scale rate information, the current position information and information on the travel route.

9. A portable travel guiding device used with a travel guiding device including: a map information acquirer which acquires map information; a current position information acquirer which acquires current position information on a current position of a mobile body; a display controller which performs control such that a region of the map information is displayed on a display, the region containing the current position, the display controller recognizing a scale rate of the map information displayed on the display; a request signal recognizer which recognizes a request signal for requesting a transfer of the map information; and an information converter which recognizes the request signal, generates a code having a data structure defining a predetermined image, the code containing scale rate information on the scale rate of the map information and the current position information, the code being optically readable, the information converter operating the display controller to display the code as the image on the display, the portable travel guiding device, comprising:
a terminal communicating section which sends and receives information via a network, a terminal display which displays map information;
an image pickup unit;
an information acquirer which acquires the scale rate information and the current position information from the code which is displayed on the display of the travel guiding device and captured by the image pickup unit;
a map information reception controller which operates the terminal communicating section to receive the region of the map information corresponding to the scale rate of the scale rate information and containing the current position via the network from a storage storing the map information; and
a terminal display controller which operates the terminal display to display the received map information.

10. The portable travel guiding device according to claim 9, wherein when the map information reception controller recognizes that the storage contains no map information having a common scale rate to the scale rate of the scale rate information acquired by the information acquirer, the map information reception controller operates the terminal communicating section to receive the map information having a scale close to the scale rate.

11. The portable travel guiding device according to claim 9, comprising:

a positioning section which positions a current position; and a position information acquirer which acquires position information on the positioned current position; wherein the terminal display controller superposes the current position of the position information on the map information displayed on the display.

12. The portable travel guiding device according to claim 9, comprising:

a terminal travel route retriever which retrieves a travel route from the current position to a destination based on the scale rate information and the current position information which are acquired from the code by the information acquirer and based on destination information on a position of the destination, wherein the terminal display superposes the travel route on the map information.

13. A travel guiding system, comprising:

a travel guiding device including: a map information acquirer which acquires map information; a current position information acquirer which acquires current position information on a current position of a mobile body; a display controller which performs control such that a region of the map information is displayed on a display, the region containing the current position, the display controller recognizing a scale rate of the map information displayed on the display; a request signal recognizer which recognizes a request signal for requesting a transfer of the map information; and an information converter which recognizes the request signal, generates a code having a data structure defining a predetermined image, the code containing scale rate information on the scale rate of the map information and the current position information, the code being optically readable, the information converter operating the display controller to display the code as the image on the display; and a portable travel guiding device operating such that the map information is displayed on the terminal display based on the code displayed on the display of the travel guiding device, wherein the portable travel guiding device includes: a terminal communicating section which sends and receives information via a network; a terminal display which displays map information; an image pickup unit; an information acquirer which acquires the scale rate information and the current position information from the code which is displayed on the display of the travel guiding device and captured by the image pickup unit; a map information reception controller which operates the terminal communicating section to receive the region of the map information corresponding to the scale rate of the scale rate information and containing the current position via the network from a storage storing the map information; and a terminal display controller which operates the terminal display to display the received map information.

14. A travel guiding system, comprising:

a travel guiding device including: a map information acquirer which acquires map information; a current position information acquirer which acquires current position information on a current position of a mobile body; a display controller which performs control such that a region of the map information is displayed on a display, the region containing the current position, the display controller recognizing a scale rate of the map information displayed on the display; a request signal recognizer which recognizes a request signal for requesting a transfer of the map information; and an information converter which recognizes the request signal, generates a code having a data structure defining a predetermined image, the code containing scale rate information on the scale rate of the map information and the current position information, the code being optically readable, the information converter operating the display controller to display the code as the image on the display; and a portable travel guiding device operating such that the map information is displayed on the terminal display based on the code displayed on the display of the travel guiding device, wherein the portable travel guiding device includes: a terminal communicating section which sends and receives information via a network; a terminal display which displays map information; an image pickup unit; an information acquirer which acquires the scale rate information and the current position information from a code having a data structure of a predetermined image, the code being captured by the image pickup unit, the code containing scale rate information on a scale rate of the map information and current position information on a current position of a mobile body, the code being optically readable; a map information reception controller which operates the terminal communicating section to receive the region of the map information corresponding to the scale rate of the scale rate information and containing at least the current position via the network from a storage storing the map information when the map information reception controller recognizes acquisition of the scale rate information and the current position information; and a terminal display controller which operates the terminal display to display the received map information.

15. A travel guiding method performed by a computer, comprising:

acquiring current position information on a current position of a mobile body and map information;

displaying a region of the map information containing the current position on a display;

providing guidance on a travel status of the mobile body;

on recognition of a request signal for a transfer of the map information, generating a code having a data structure defining a predetermined image, the code containing scale rate information on a scale rate of the map information and the current position information, the code being optically readable; and displaying the code on the display.

16. A travel guiding method performed by a computer, comprising:

reading a code displayed by capturing with an image pickup unit of the computer, the code being displayed by acquiring current position information on a current position of a mobile body and map information; displaying a region of the map information containing the current position on a display for providing guidance on a travel status of the mobile body; on recognition of a request signal for a transfer of the map information, generating a code having a data structure defining a predetermined image, the code containing scale rate information on a scale rate of the map information and the current position information, the code being optically readable; and displaying the code on the display;

acquiring the scale rate information and the current position information which are read from the code;

receiving with a communicating section a region of the map information via a network from a storage storing the map information, the region corresponding to a scale rate of the scale rate information and containing at least the current position; and displaying the received map information on a terminal display.

17. A travel guiding program stored on a non-transitory computer readable medium controlling a computer to work as a travel guiding device including: a map information acquirer which acquires map information; a current position information acquirer which acquires current position information on a current position of a mobile body; a current position information acquirer which acquires current position information on a current position of a mobile body; a display controller which performs control such that a region of the map information is displayed on a display, the region containing the current position, the display controller recognizing a scale rate of the map information displayed on the display; a request signal recognizer which recognizes a request signal for requesting a transfer of the map information; and an information converter which recognizes the request signal, generates a code having a data structure defining a predetermined image, the code containing scale rate information on the scale rate of the map information and the current position information, the code being optically readable, the information converter operating the display controller to display the code as the image on the display.

18. A travel guiding program stored on a non-transitory computer readable medium controlling a computer to work as a portable travel guiding device used with a travel guiding device, wherein the travel guiding device includes: a map information acquirer which acquires map information; a current position information acquirer which acquires current position information on a current position of a mobile body; a display controller which performs control such that a region of the map information is displayed on a display, the region containing the current position, the display controller recognizing a scale rate of the map information displayed on the display; a request signal recognizer which recognizes a request signal for requesting a transfer of the map information; and an information converter which recognizes the request signal, generates a code having a data structure defining a predetermined image, the code containing scale rate information on the scale rate of the map information and the current position information, the code being optically readable, the information converter operating the display controller to display the code as the image on the display, and the portable travel guiding device includes: a terminal communicating section which sends and receives information via a network; a terminal display which displays map information; an image pickup unit; an information acquirer which acquires the scale rate information and the current position information from the code which is displayed on the display of the travel guiding device and captured by the image pickup unit; a map information reception controller which operates the terminal communicating section to receive the region of the map information corresponding to the scale rate of the scale rate information and containing the current position via the network from a storage storing the map information; and a terminal display controller which operates the terminal display to display the received map information.

19. A travel guiding program stored on a non-transitory computer readable medium operating a computer to execute a travel guiding method performed by the computer, wherein the method includes: acquiring current position information on a current position of a mobile body and map information; displaying a region of the map information containing the current position on a display; providing guidance on a travel status of the mobile body; on recognition of a request signal for a transfer of the map information, generating a code having a data structure defining a predetermined image, the code containing scale rate information on a scale rate of the map information and the current position information, the code being optically readable; and displaying the code on the display.

20. A travel guiding program stored on a non-transitory computer readable medium operating a computer to execute a travel guiding method performed by the computer, wherein the method includes: reading a code displayed by capturing with an image pickup unit of the computer, the code being displayed by acquiring current position information on a current position of a mobile body and map information; displaying a region of the map information containing the current position on a display for providing guidance on a travel status of the mobile body; on recognition of a request signal for a transfer of the map information, generating a code having a data structure defining a predetermined image, the code containing scale rate information on a scale rate of the map information and the current position information, the code being optically readable; and displaying the code on the display; acquiring the scale rate information and the current position information which are read from the code; receiving with a communicating section a region of the map information via a network from a storage storing the map information, the region corresponding to a scale rate of the scale rate information and containing at least the current position; and displaying the received map information on a terminal display.

21. A non-transitory recording medium recording a travel guiding program which operates a computer to work as a travel guiding device, wherein the travel guiding program is recorded in a manner readable by the computer, and the travel guiding device includes: a map information acquirer which acquires map information; a current position information acquirer which acquires current position information on a current position of a mobile body; a display controller which performs control such that a region of the map information is displayed on a display, the region containing the current position, the display controller recognizing a scale rate of the map information displayed on the display; a request signal recognizer which recognizes a request signal for requesting a transfer of the map information; and an information converter which recognizes the request signal, generates a code having a data structure defining a predetermined image, the code containing scale rate information on the scale rate of the map information and the current position information, the code being optically readable, the information converter operating the display controller to display the code as the image on the display.

22. A non-transitory recording medium recording a travel guiding program which operates a computer to work as a portable travel guiding device, wherein the travel guiding program is recorded in a manner readable by the computer, and the portable travel guiding device is used with a travel guiding device and includes: the travel guiding device includes: a map information acquirer which acquires map information; a current position information acquirer which acquires current position information on a current position of a mobile body; a display controller which performs control such that a region of the map information is displayed on a display, the region containing the current position, the display controller recognizing a scale rate of the map information displayed on the display; a request signal recognizer which recognizes a request signal for requesting a transfer of the map information; and an information converter which recognizes the request signal, generates a code having a data structure defining a predetermined image, the code containing scale rate information on the scale rate of the map information and the current position information, the code being optically readable, the information converter operating the display controller to display the code as the image on the display, and the portable travel guiding device includes: a terminal communicating section which sends and receives information via a network; a terminal display which displays map information; an image pickup unit; an information acquirer which acquires the scale rate information and the current position information from the code which is displayed on the display of the travel guiding device and captured by the image pickup unit; a map information reception controller which operates the terminal communicating section to receive the region of the map information corresponding to the scale rate of the scale rate information and containing the current position via the network from a storage storing the map information; and a terminal display controller which operates the terminal display to display the received map information.

23. A non-transitory recording medium recording a travel guiding program, wherein the travel guiding program is recorded in a manner readable by a computer, and the program operates the computer to execute a method which is performed by the computer and includes: acquiring current position information on a current position of a mobile body and map information; displaying a region of the map information containing the current position on a display; providing guidance on a travel status of the mobile body; on recognition of a request signal for a transfer of the map information, generating a code having a data structure defining a predetermined image, the code containing scale rate information on a scale rate of the map information and the current position information, the code being optically readable; and displaying the code on the display.

24. A non-transitory recording medium recording a travel guiding program, wherein the travel guiding program is recorded in a manner readable by a computer, and the program operates the computer to execute a method which is performed by the computer and includes: reading a code displayed by capturing with an image pickup unit of the computer, the code being displayed by acquiring current position information on a current position of a mobile body and map information; displaying a region of the map information containing the current position on a display for providing guidance on a travel status of the mobile body; on recognition of a request signal for a transfer of the map information, generating a code having a data structure defining a predetermined image, the code containing scale rate information on a scale rate of the map information and the current position information, the code being optically readable; and displaying the code on the display; acquiring the scale rate information and the current position information which are read from the code; receiving with a communicating section a region of the map information via a network from a storage storing the map information, the region corresponding to a scale rate of the scale rate information and containing at least the current position; and displaying the received map information on a terminal display.

* * * * *